(12) United States Patent
Hess et al.

(10) Patent No.: US 12,129,353 B2
(45) Date of Patent: Oct. 29, 2024

(54) CELLULOSE-ENABLED ORIENTATIONALLY ORDERED FLEXIBLE GELS

(71) Applicant: The Regents of the University of Colorado, Denver, CO (US)

(72) Inventors: Andrew J. Hess, Louisville, CO (US); Qingkun Liu, Boulder, CO (US); Ivan I. Smalyukh, Boulder, CO (US)

(73) Assignee: The Regents of the University of Colorado, Boulder, CO (US)

( * ) Notice: Subject to any disclaimer, the term of this patent is extended or adjusted under 35 U.S.C. 154(b) by 0 days.

(21) Appl. No.: 17/532,889

(22) Filed: Nov. 22, 2021

(65) Prior Publication Data
US 2022/0153952 A1    May 19, 2022

Related U.S. Application Data

(62) Division of application No. 15/868,714, filed on Jan. 11, 2018, now Pat. No. 11,180,627.
(Continued)

(51) Int. Cl.
*C08J 9/35* (2006.01)
*C08J 9/00* (2006.01)
(Continued)

(52) U.S. Cl.
CPC . *C08J 9/35* (2013.01); *C08J 9/28* (2013.01); *C09K 5/14* (2013.01); *C08J 9/0061* (2013.01);
(Continued)

(58) Field of Classification Search
CPC ..... C08J 9/35; C08J 9/28; C08J 9/0061; C08J 2205/02; C08J 2205/022; C08J 2205/024; C08J 2205/026; C08J 2205/06; C08J 2207/00; C08J 2301/02; C08J 2383/04; C09K 5/14
See application file for complete search history.

(56) References Cited

U.S. PATENT DOCUMENTS 3,549,308 A    12/1970 Carter
5,629,055 A    5/1997 Revol
(Continued)

FOREIGN PATENT DOCUMENTS

CN    105837851 A    8/2016
JP    2010222750 A    10/2010
(Continued)

OTHER PUBLICATIONS

Cranston et al. ("Chemically Cross-Linked Cellulose Nanocrystal Aerogels with Shape Recovery and Superabsorbent Properties" Chem. Mater. 2014, 26, 6016-6025) (Year: 2014).*
(Continued)

*Primary Examiner* — Travis M Figg
(74) *Attorney, Agent, or Firm* — Snell & Wilmer L.L.P.

(57) ABSTRACT

Disclosed are cellulose-based flexible gels containing cellulose nanorods, ribbons, fibers, and the like, and cellulose-enabled inorganic or polymeric composites, wherein the gels have tunable optical, heat transfer, and stiffness properties. The disclosed gels are in the form of hydrogels, organogels, liquid-crystal (LC) gels, and aerogels, depending on the solvents in the gels.

15 Claims, 16 Drawing Sheets

Related U.S. Application Data

(60) Provisional application No. 62/444,896, filed on Jan. 11, 2017.

(51) Int. Cl.
   *C08J 9/28* (2006.01)
   *C09K 5/14* (2006.01)

(52) U.S. Cl.
   CPC ...... *C08J 2205/02* (2013.01); *C08J 2205/022* (2013.01); *C08J 2205/024* (2013.01); *C08J 2205/026* (2013.01); *C08J 2205/06* (2013.01); *C08J 2207/00* (2013.01); *C08J 2301/02* (2013.01); *C08J 2383/04* (2013.01)

(56) References Cited

U.S. PATENT DOCUMENTS

| | | | |
|---|---|---|---|
| 5,843,333 A * | 12/1998 | Hakemi | C09K 19/40 252/299.5 |
| 6,316,092 B1 | 11/2001 | Frank | |
| 8,900,412 B2 | 12/2014 | Borkar et al. | |
| 9,328,211 B2 | 5/2016 | Nemoto et al. | |
| 2006/0194072 A1 | 8/2006 | Toreki et al. | |
| 2006/0263587 A1 | 11/2006 | Ou et al. | |
| 2007/0259169 A1 | 11/2007 | Williams et al. | |
| 2008/0220333 A1 | 9/2008 | Yano | |
| 2009/0029147 A1 | 1/2009 | Tang | |
| 2009/0176905 A1 | 7/2009 | Matsuzawa et al. | |
| 2010/0203313 A1 | 8/2010 | Olsson et al. | |
| 2010/0233481 A1 | 9/2010 | Isogai et al. | |
| 2011/0021671 A1 | 1/2011 | Kuga et al. | |
| 2011/0286948 A1 | 11/2011 | Lin et al. | |
| 2012/0111517 A1 | 5/2012 | Borkar et al. | |
| 2013/0018112 A1 | 1/2013 | Thielemans | |
| 2013/0116427 A1 | 5/2013 | Buchanan et al. | |
| 2013/0264732 A1 | 10/2013 | Youngblood et al. | |
| 2014/0134415 A1 | 5/2014 | Gong et al. | |
| 2014/0287641 A1 | 9/2014 | Steiner, III | |
| 2016/0030908 A1 | 2/2016 | Horvath et al. | |
| 2016/0032073 A1 | 2/2016 | Nguyen et al. | |
| 2018/0237608 A1 | 8/2018 | Hess et al. | |

FOREIGN PATENT DOCUMENTS

| | | |
|---|---|---|
| WO | 2012154602 A1 | 11/2012 |
| WO | 2014201562 A1 | 12/2014 |

OTHER PUBLICATIONS

Sebe et al. ("Cellulose nanocrystals and microfibrillated cellulose as building blocks for design of hierarchical functional materials" J. Mater. Chem., 2012, 22, 20105-20111) (Year: 2012).*
Yano, S., et al., Effect of Hydrogen Bond Formation on Dynamic Mechanical Properties of Amorphous Cellulose, J. Appl. Polym. Sci., 1976, 20(12): 3221-3231.
Yamanaka, S., et al., The Structure and Mechanical Properties of Sheets Prepared from Bacterial Cellulose, J. Mater. Sci., 1989; 24(9): 3141-3145.
Iguchi, M., et al., Bacterial Cellulose—A Masterpiece of Nature's Arts, J. Mater. Sci., 2000, 35(2): 261-270.
Ishida, T., et al., Role of Water-Soluble Polysacherides in Bacterial Cellulose Production, Biotechnol. Bioeng., 2003; 83(4): 474-478.
Yano, H., et al., Optically transparent composites reinforced with networks of bacterial nanofibers, Adv. Mater., 17 (2005), pp. 153-155.
Fischer, F., et al., Cellulose-based aerogels, Polymer, 47 (2006), pp. 7636-7645.
Pääkkö, M., et al., Long and Entangled Native Cellulose I Nanofibers Allow Flexible Aerogels and Hierarchically Porous Templates for Functionalities, Soft Matter, 2008; 4(12): 2492.
Cheng, KC, et al., Effect of Different Additives on Bacterial Cellulose Production by Acetobacter Xylinum and Analysis of Material Property, Cellulose, 2009, 16(6), pp. 1033-1045.
Huang, HC, et al., In Situ Modification of Bacterial Cellulose Network Structure by Adding Interfering Substances During Fermentation, Bioresour. Technol., 2010, 101(15): 6084-6091.
Cai, J., et al., Cellulose-silica nanocomposite aerogels by in situ formation of silica in cellulose gel, Angew. Chem. Int. Ed., 124 (2012), pp. 2118-2121.
Liebner, F. et al., Bacterial Cellulose Aerogels: From Lightweight Dietary Food to Functional Materials; ACS Symposium Series, 2012, Chapter 4, pp. 57-74.
Tingaut, P., et al., Cellulose nanocrystals and microfibrillated cellulose as building blocks for the design of hierarchical functional materials, J. Mater. Chem., 2012, 22, pp. 20105-20111.
Jiang, F. et al., Chemically and mechanically isolated nanocellulose and their self-assembled structures, Carbohydrate Polymers, 2013, 95, pp. 32-40 (Year: 2013).
Shi, J., et al., An Environment-Friendly Thermal Insulating Materials from Cellulose and Plasma Modification, J. Appl. Polym. Sci., 2013, 130, pp. 3652-3658 (Year: 2013).
Hayase, G., et al., Polymethylsilsesquioxane-cellulose nanofiber biocomposite aerogels with high thermal insulation, bendability, and superhydrophobicity, Appl. Mater. Interfaces, 6 (2014), pp. 9466-9471.
Kobayashi, Y., et al., Aerogels with 3D Ordered Nanofiber Skeletons of Liquid-Crystalline Nanocellulose Derivatives as Tough and Transparent Insulators, Angew. Chem Int. Ed., 2014, 53, pp. 10394-10397.
Zeng, M., et al., Bacterial Cellulose Films: Influence of Bacterial Strain and Drying Route on Film Properties, Cellulose, 2014, 21(6), pp. 4455-4469.
Sai, H., et al., Surface Modification of Bacterial Cellulose Aerogels' Web-like Skeleton for Oil/Water Separation; ACS Appl. Mater. Interfaces; 2015, 7, pp. 7373-7381.
Buettner, J., Investigation of Bacterial Cellulose as a Carbon Fiber Precursor and its Potential for Piezoelectric Energy Harvesting, a thesis presented to the faculty of the Graduate School of Cornell University, 2016, pp. 1-89.
Leitch, M., et al., Bacterial Nanocellulose Aerogel Membranes: Novel High-Porosity Materials for Membrane Distillation, Environ. Sci. Tech. Letter, 2016, 3, 3, pp. 85-91 (Year: 2016).
Leitch, M., et al., Supplemental Information (Year: 2016).
Zanini, M., et al., Producing aerogels from silanized cellulose nanofiber suspension, Cellulose 23017 (published Nov. 2016), 24, p. 769 (2016).
Jia, Y., et al., Preparation and characterization of a novel bacterial cellulose/chitosan bio-hydrogel, Nanomaterials and Nanotechnology, 2017, vol. 7, pp. 1-8.
WIPO; International Search Report mailed Sep. 11, 2019 in International Appl. No. PCT/US2019/037122.
WIPO; Written Opinion mailed Sep. 11, 2019 in International Appl. No. PCT/US2019/037122.
WIPO; International Search Report mailed Nov. 6, 2019 in International Appl. No. PCT/US2019/037123.
WIPO; Written Opinion mailed Nov. 6, 2019 in International Appl. No. PCT/US2019/037123.
USPTO; Non-Final Office Action mailed Apr. 28, 2020 in U.S. Appl. No. 16/017,319.
USPTO; Restriction Requirement mailed Mar. 2, 2020 in U.S. Appl. No. 16/017,319.
USPTO; Final Office Action mailed Oct. 21, 2020 in U.S. Appl. No. 16/017,319.
USPTO; Non-Final Office Action mailed Apr. 29, 2021 in U.S. Appl. No. 16/017,319.

* cited by examiner

CELLULOSE-ENABLED ORIENTATIONALLY ORDERED FLEXIBLE GELS

CROSS-REFERENCE TO RELATED APPLICATIONS

This application is a divisional of U.S. Non-Provisional application Ser. No. 15/868,714, filed Jan. 11, 2018, and entitled "CELLULOSE-ENABLED ORIENTATIONALLY ORDERED FLEXIBLE GELS," which claims the benefit of U.S. Provisional Application No. 62/444,896, filed Jan. 11, 2017, and entitled "CELLULOSE-ENABLED ORIENTATIONALLY ORDERED FLEXIBLE GELS," the contents of which are incorporated herein by reference to the extent such contents do not conflict with the present disclosure.

FEDERALLY SPONSORED RESEARCH

This discovery was made with Government support under grant DMR-1410735 awarded by the U.S. National Science Foundation. The Government has certain rights in the invention.

FIELD

Disclosed are cellulose-based flexible gels containing cellulose nanorods, ribbons, fibers, and the like, and cellulose-enabled inorganic or polymeric composites, wherein the gels have tunable optical, heat transfer, and stiffness properties. The disclosed gels are in the form of hydrogels, organogels, liquid-crystal (LC) gels, and aerogels. Further disclosed are highly transparent and flexible cellulose nanofiber-polysiloxane composite aerogels featuring enhanced mechanical robustness, tunable optical anisotropy, and low thermal conductivity.

BRIEF DESCRIPTION OF THE FIGURES

FIG. 9A depicts surface modification by allylamine. FIG. 9B depicts surface modification by a 2-(carbamoyloxy)-N,N,N-trimethylethanaminium adduct. FIG. 9C depicts surface modification by example a methoxy polyethylene glycol amine (mPEG-amine).

FIG. 17A shows that the colloidal dispersions consist of mostly individualized TOCNs, each of diameter $D_c \approx 5$ nm and length $L_c \approx 1\text{-}2$ μm. FIGS. 17B and 17C are scanning electron microscopy (SEM) that depict the well-defined and uniform-diameter 10-15 nm nanofibers that are formed by polysiloxane.

DETAILED DESCRIPTION

Figure 1:
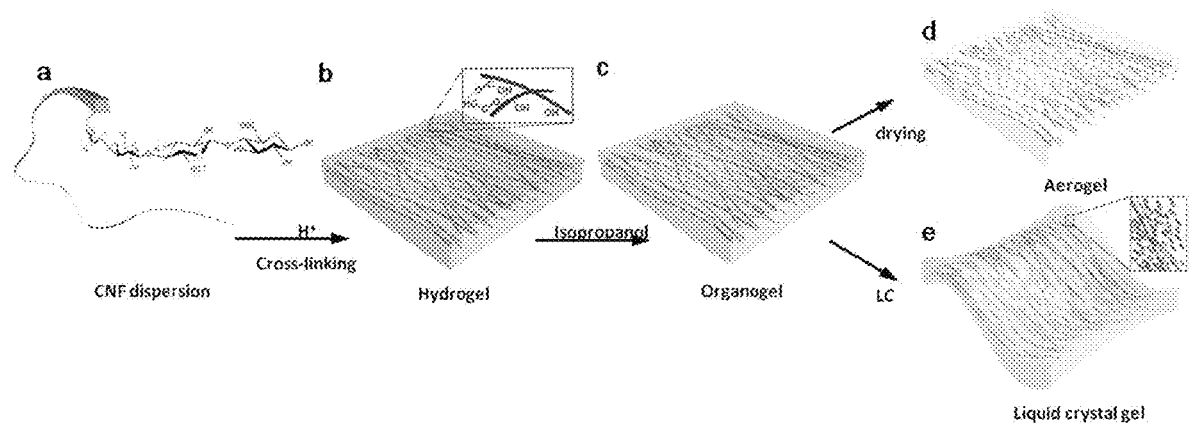
FIG. 1 shows the schematic of fabrication procedures of cellulose-enabled ordered gels (a) cellulose nanomaterials aqueous dispersion, (b) hydrogel, (c) organogel (d) aerogel, and (e) liquid crystal gel.

As used herein, a "gel" is understood to be a substantially dilute cross-linked system that exhibits no flow when in the steady state. The primary constituent of the gel is the ambient fluid surrounding it, whose form can be a liquid or gas. Prefixes such as "aero," "organo," "hydro," and variations are understood to indicate the ambient fluid in the cross-linked gel matrix and primary component of the gel material.

The disclosed gels contain cellulosic nanocomposites that are aligned in ordered liquid crystal phases. As such, the disclosed gels allow the formulator to adjust the optical transmissivity of the gel, thereby configuring the optical properties of the gel to range from opaque to transparent. In addition, the properties can be adjusted to inter act with a wide range of the electromagnetic spectra, for example, from the visible spectrum to infrared spectrum. In one embodiment, the thermal conductivity of the gel can be adjusted. The bulk properties of the disclosed gels, for example the level of stiffness or flexibility can be adjusted by the choice of the constituent cellulosic material, for example, nanorods, ribbons, fibers, and the like, as well as, the concentration of these materials in the resulting gels.

As used herein, a "film" and variations indicate non-porous lamellae ranging in thickness from about 10 nm to 1 mm and arbitrary lateral extent.

As used herein the term "cross-section" means width and the terms are used interchangeably. The disclosed cellulosic nanomaterials have a width from about 10 nm to about 500 nm. The length of the nanomaterials is at least ten times the width.

The term "composition" as used herein refers to the disclosed cellulose nanomaterial aqueous dispersions, hydrogels, organogels, aerogels, and liquid crystal gels. The compositions can be a single layer of material comprising nanomaterials or the composition can be formed from two or more distinct layers wherein each layer consists of only one material. As a non-limiting example, one layer can consist of an ordered nematic cellulosic gel onto which a second layer of cholesterically aligned cellulose film is applied thereto. This layering thereby forms a unified composite material with distinct layers.

The term "hydrogel" as used herein represents a network of cellulosic material as a colloidal gel dispersed in a carrier. In one embodiment the carrier is water. In another embodiment the carrier is a mixture of a water compatible (miscible) organic solvent. The cellulosic material can be cross-linked or non-crosslinked.

The term "organogel" as used herein is a gel wherein the aqueous phase of a precursor hydrogel has had substantially all of the water removed and replaced by a water compatible solvent. Non-limiting examples of compatible solvents include methanol, ethanol, propanol and isopropanol. In one embodiment, the disclosed organogels have a two dimensional cross-linked network. In another embodiment the disclosed organogels have a three dimensional crosslinked network.

The term "aerogel" as used herein refers to a gel derived from the further processing of a disclosed organogel as described herein.

The term "liquid crystal gel" refers to the compositions derived from the further processing of the disclosed organogels as described herein.

The term "nanomaterial" refers to the disclosed cellulosic material. The width of these materials is in the nanometer range, whereas the length of the cellulosic material can vary from nanometer length to micrometer. The terms "nanomaterial," "cellulosic material" and "cellulosic nanomaterial" are used interchangeably throughout the present disclosure.

The term "nematic" as used herein refers to a composition wherein the disclosed cellulosic materials are aligned in one direction. In addition, the cellulosic materials are free to flow and their center of mass positions are randomly distributed, but still maintain their long-range directional order. The disclosed nematic compositions are uniaxial: they have one axis that is longer and preferred, with the other two being equivalent.

The term "cholesteric" as used herein refers to a composition with a helical structure and which is therefore chiral. The disclosed cholesteric compositions are organized in layers with no positional ordering within layers, but a director axis which varies with layers. The variation of the director axis can be periodic in nature. If present, the period of this variation (the distance over which a full rotation of 360° is completed) is known as the pitch, which can be adjusted by the formulator, and the degree of pitch determines the wavelength of electromagnetic radiation which is reflected.

The abbreviation "TOCN" as used throughout the specification means "TEMPO-oxidized cellulose nanofibers."

The term "low molecular weight compounds comprising a cationic moiety" means a compound that has a moiety that can react with an oxidized cellulose carboxyl group in addition to a separate cationic moiety. Non-limiting examples of units that can react with an oxidized cellulose carboxyl group include hydroxyl group, an amino group, a thiol group, and the like. A non-limiting example of a cationic moiety includes a quaternary ammonium group.

In one aspect of the present disclosure are compositions comprising cellulosic nanoribbons that are aligned together and which orientation can be adjusted by the formulator. The disclosed nanoribbons have aspect ratios from about 1:100 to about 1:1000. In one aspect, the disclosed nanoribbons can be used to form a nematic flexible gel.

These cellulose-based flexible gels, can comprise cellulose ribbons, fibers, and other constituent-particle structures having in one embodiment aspect ratios of about 1:1000. These flexible gels are formed from linking the cellulose particle networks within the material. The original cellulose solvent which is used for the formation of the gel network can be retained or replaced to yield a variety of gel types, for example, hydrogels, alcogels, aerogels, and liquid-crystal gels. The use of the disclosed cellulosic material to form the gel network allows the formulator to adjust the flexibility of the gels.

For example, cellulosic nanomaterials having a larger aspect ratio results in less elastomeric crosslinking. The aspect ratios allow for a greater degree of flexibility or rigidity depending upon the selection of cellulosic nanomaterial. In addition, the cellulose particles can be ordered through chemical and mechanical means to yield a lyotropic liquid crystalline dispersion with ordered phases. The ordering can be preserved during the cross-linking process to form various ordered gels, non-limiting examples of which are given above. FIG. 1 illustrates the fabrication procedure of cellulosic ordered gels.

In addition to flexibility, the optical transmissivity of the disclosed gels can be adjusted to range from opaque to transparent. The degree of opaqueness or transparency can also be matched of any wavelength or range of wavelength in the electromagnetic spectrum. These results can be obtained by adjusting the various properties of the disclosed composites, i.e., density of cellulosic nanomaterial or size distribution. Also, the addition of adjunct ingredients such as liquid crystal materials can be used to tune the optical properties of the disclosed composites.

A further property which can be tailored to the needs of the formulator is the degree of thermal resistance displayed by the gels. Several factors enable the adjustment of the thermal resistive properties: (1) the intrinsically low thermal conductivity of cellulose, (2) the rarefication of fluid within the cellulose network thereby regulating the thermal convection, and (3) the thermal conductivity and convection properties of the fluids which comprise the cellulose-gel network.

In another aspect of the present disclosure are compositions comprising cellulosic nanorods that are aligned and which orientation can be adjusted by the formulator. The disclosed nanoribbons have aspect ratios from about 1:10 to about 1:100. In one aspect, the disclosed nanorods can be used to form compositions with a cholesteric phase.

In one embodiment the disclosed nanocrystals form ordered films that can be ordered into a cholesteric phase in the film to form a periodic structure whose pitch and pitch gradient are adjustable for broad-band Bragg reflection of incident electromagnetic radiation. In another embodiment the resulting ordered gels are obtained because of the small relative aspect ratios of the cellulose nanorods or similar nanomaterials that comprise the nanocrystals. Nanorods result in the formation of different phases than other nanomaterials, i.e., nanofibers. Because of this fact broad-band reflection is enabled in ordered cellulose gels that are formed from cellulose structures with aspect ratios of about 1:10 to about 1:100.

As such, the mechanical flexibility, optical transmissivity, and thermal resistance can be configured by tuning the same parameters described nanofibers, except that those parameters now refer specifically to cellulose nanorods or other geometrically anisotropic cellulose structures.

A further aspect of the present disclosure relates to composite structures comprising lamellae that are formed from the disclosed aerogels or liquid crystal gels. Composite structures with lamellae can be formed from the disclosed compositions that comprise nanofiber-like cellulosic materials (nematic phase) or from nanorod-like cellulosic materials (cholesteric phase). These composite structures comprise a plurality of layers.

In a still further aspect of the present disclosure are composite structures wherein an amount of the cellulosic nanomaterial is replaced with one or more adjunct materials which can affect the alignment of the composite nanomaterials. In one embodiment a portion of the cellulosic nanomaterial is replaced with liquid crystals. As such, the nematic phase or cholesteric phase gels can have the liquid phase substituted by other anisotropic organic or inorganic materials. In one embodiment silica is introduced into the hydrogel. In another embodiment liquid crystal material, for example, 1-(trans-4-hexylcyclohexyl)-4-isothiocyanatobenzene can replace the carrier of the hydrogel. In another embodiment, after the incorporation and alignment of non-cellulosic materials, the cellulose can be partially or totally removed, by chemical means, to yield gels and films with partial or total cellulose substitution.

In a yet further aspect of the present disclosure are lamellae which comprise the disclosed composite structures. According to this aspect the lamellae are formed from two or more distinct layers wherein each layer comprises different materials. The cellulosic nanomaterials that comprise each layer can further serve as a template and can be substituted partially or totally by other materials such as silica or other polymers.

Further disclosed are methods for the preparation of the composite structures.

Cellulose Nanomaterials

The disclosed cellulose nanomaterials can have a variety of shapes and cross-sectional geometries that depend upon the nanomaterial's natural source and the process used to produce the particles. A disclosed cellulose nanomaterial can have a shape that is a rod, fiber, ribbon, whisker, and the like.

The disclosed cellulose nanomaterials can be obtained by chemical or mechanical treatment of a variety of natural sources, for example, cotton, soft wood pulp, hard wood pulp, tunicate and bacterial cellulose and the like. Typically nanorods and nanofibers can be obtained from multiple sources, for example, cotton and bacteria.

Figure 2:
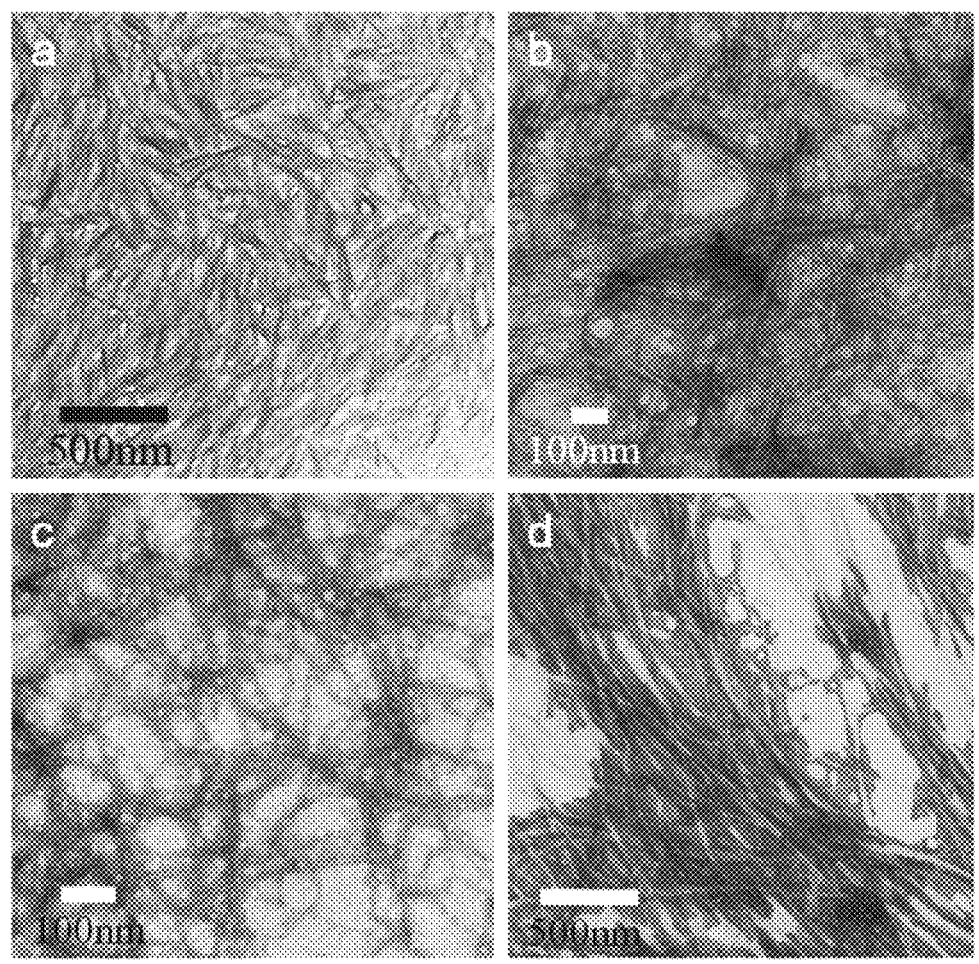
FIG. 2 shows transmission electron microscopy (TEM) images of cellulose nanorods, nanofibers, nanoribbons from different sources: (a) cellulose nanorods from cotton, (b) cellulose nanowires from cotton, (c) cellulose nanowires from wood pulp, and (d) cellulose nanoribbons from bacterial cellulose.

In one embodiment, the disclosed nanocellulose can have a length from about 10 μm to 100 μm with cross sections from about 10 nm to 50 nm. In another embodiment, the disclosed nanocellulose can have a length from about 1 μm to 10 μm with cross sections from about 3 nm to 10 nm. In a yet another embodiment, the disclosed nanocellulose can have a length from about 100 nm to 1 μm with cross sections from about 3 nm to 10 nm. FIG. 2 shows TEM micrographs of cellulose particles with characteristic length scales of the aforementioned embodiments: (a) cellulose nanorods of 10 nm×200 nm depends upon the chemical treatment from cotton, (b) cellulose nanowires of 7 nm×800 nm from cotton, (c) cellulose nanowires of 4.8 nm×1 μm from wood pulp, and (d) cellulose nanoribbons of 10 nm×50 nm×10 μm from bacterial cellulose.

The cellulose nanomaterials can be obtained by chemical hydrolysis of natural cellulose by sulfuric acid, hydrochloric acid, etc. or by 2,2,6,6-tetramethylpiperidine-1-oxyl radical (TEMPO)-mediated oxidation.

Alignment Methods

The cellulose nanomaterials can be aligned by linear or circular shearing for nematic or cholesteric ordering, respectively. Nematic ordering of the disclosed cellulose nanofibers is shown in FIG. 1(b). In one embodiment, the cellulose nanomaterial dispersion can be confined between glass plates in a mold such that, when a shear stress is applied from the plates in the specified direction, individual nanocellulose particles align to form a singular director alignment across the confined dispersion. In another embodiment, the nanocellulose suffers unidirectional alignment under extrusion from a sufficiently small diameter nozzle, syringe, or similar device. With extrusion alignment, no confining plates are needed such that the aligned dispersion takes the form of a narrow bead, with linear extent much greater than its cross-sectional extent, which rests on a supportive substrate or other structure. In yet another embodiment, the helical axis of cellulose nanorods in cholesteric phase can be aligned by anticlockwise circular shearing during the evaporation of the dispersion.

The disclosed cellulose nanomaterials can also be aligned by magnetic or electric fields. In one embodiment, the magnetic anisotropy of cellulose nanomaterial's relative permeability can be exploited to cause uniform alignment of nanocrystals. Under sufficiently strong magnetic fields (about 1 T), uniform alignment of nanocrystals perpendicular to the magnetic field is achieved through the magnetic interaction of the induced magnetic dipole moments of the cellulose nanomaterial with the applied magnetic field. In another embodiment, an oscillating electric field can also be used to aligned the cellulose nanomaterials in a similar manner.

Ordered Hydrogels

Figure 3:
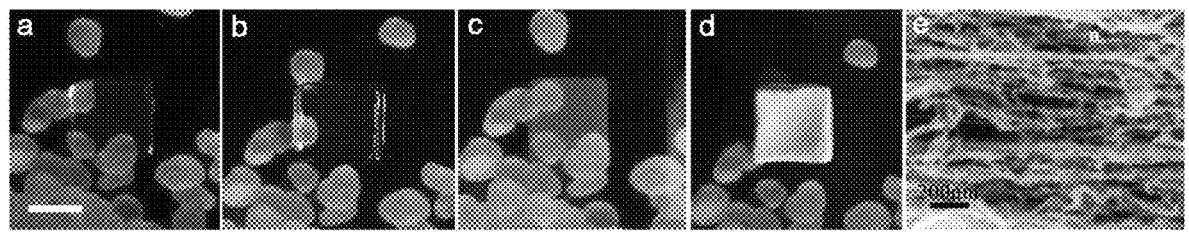
FIG. 3 shows photographs of nematic cellulose (a) hydrogel, (b) organogel, (c) aerogel, (d) nematogel, and (e) scanning electron microscopy (SEM) image of the ordered aerogel. The scale bar is 1 cm.

The alignment of the disclosed cellulose nanomaterial dispersions can be preserved by its conversion to a hydrogel, example embodiments which are shown in FIG. 1(b) and FIG. 3(a). The extent of cross-linking of the cellulose nanomaterial establishes the degree to which uniform ordering is preserved in the dispersion. For example, a low level of crosslinking provides a weaker gelation. Conversely a greater degree of cross-linking yields firmer gelation. Gelation is accomplished by the addition of an acid, photoacid generator and exposure to light, alcohol, or other cationic exchange reagent to a uniformly ordered cellulose nanomaterial dispersion. In one embodiment, hydrochloric, acetic, nitric, sulfuric, and phosphoric acids can be added to instigate gelation. In another embodiment, $Ca^{2+}$ can be added to provide cross-linking.

Ordered Organogels

The disclosed ordered hydrogels can be transformed into organogels, as shown in FIG. 1(c) and FIG. 3(b) using a solvent exchange procedure. For example, a hydrogel can be gently shaken while immersed in an ethanol-filled bath followed by replacing the solvent at regular intervals. In this way, the water is sequentially removed from the matrix and replaced with ethanol. Other organic solvents can substitute for ethanol. Non-limiting examples of other solvents include methanol, ethanol, isopropanol, butanol, hexane, acetone, dichloromethane, dimethylformamide (DMF), dimethylsulfoxide (DMSO), and toluene.

Ordered Aerogels or Films

The disclosed cellulose aerogels or films herein can be produced from the disclosed nano-structured organogel herein above. Example aerogels are shown in FIG. 1(d) and FIG. 3(c). The resulting cellulose nanomaterial aerogel is porous having a skeleton of about 0.1-99.9%. 1-3 (10)% cellulose nanocrystals and a porosity of from about 0.01 to about 99.99%. In one embodiment the porosity is from about 97% to about 99%.

Aerogels comprising a low percentage of nanocellulosic material results aerogels having a high degree of transparency, for example, from about 1% to about 50% by weight of the aerogel. Aerogels comprising from about 50% to about 90% by weight of nanocellulosic material results aerogels having a high degree translucent scattering.

To prevent deformation and crumbling of aerogels during the drying due to surface tension and capillary pressure in the ambient atmosphere, supercritical drying, freeze drying, or ambient drying with a low surface-tension solvent are used to remove liquid solvent from cellulose nanocrystal composites while maintaining the disclosed liquid crystalline structure, such as nematic or cholesteric liquid crystalline ordering.

As disclosed previously herein, the resulting monolithic cellulose nanomaterial film is a solid material with 100% cellulose composition. Ambient drying is used to remove liquid solvent.

Ordered Liquid-Crystal Gels

The disclosed cellulose LC gels herein can be produced from the disclosed nano-structured organogel. The organic solvent is replaced with LC by solvent exchange. For the case of LC gels, the LC functions as the gel's solvent. FIG. 1(e) portrays a schematic representation of LC gels while FIG. 3(d) portrays an LC gel whose LC solvent is in the nematic phase. The disclosed compositions can comprise any LC that will serve as solvents for the gels. Non-limiting examples of nematic LCs include: 1-(trans-4-hexylcyclohexyl)-4-isothiocyanatobenzene; 4'-(hexyloxy)-4-biphenyl-carbonitrile; 4'-(octyloxy)-4-biphenyl-carbonitrile; 4'-(pentyloxy)-4-biphenylcarbonitrile; 4'-heptyl-4-biphenylcarbonitrile; 4'-hexyl-4-biphenylcarbonitrile; 4'-octyl-4-biphenylcarbonitrile; 4'-pentyl-4-biphenylcarbonitrile; 4,4'-azoxyanisole; 4-isothiocyanatophenyl 4-pentyl-bicyclo[2.2.2]octane-1-carboxylate; 4-(trans-4-pentylcyclohexyl)benzonitrile; 4-methoxycinnamic acid; N-(4-ethoxybenzylidene)-4-butylaniline; and N-(4-methoxybenzylidene)-4-butylaniline.

Cellulose-Templated Ordered Inorganic Gels or Films

Figure 4:
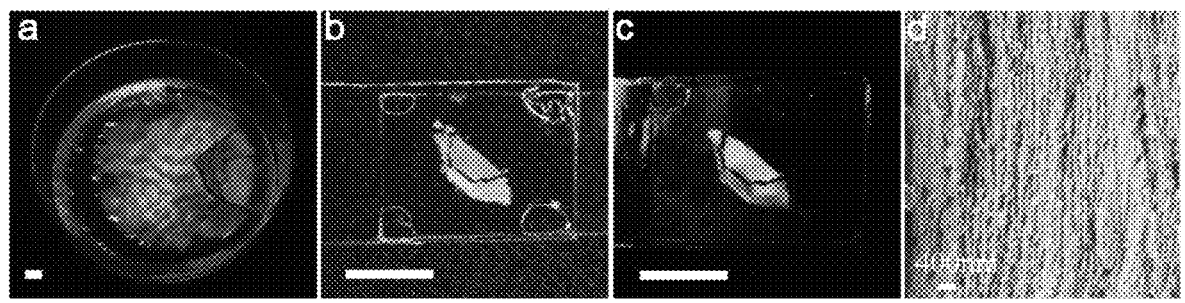
FIG. 4 shows photographs of cholesteric (a) cellulose-silica composition, (b) silica aerogel, (c) silica nematogel, and (d) SEM image of the ordered silica aerogel. The scale bar is 5 mm.

Inorganic nanomaterials can be incorporated into the heretofore disclosed ordered gels or films using cellulose nanomaterials as a template. As a non-limiting example, FIG. 4 demonstrates cellulose-enabled cholesteric (a) cellulose-silica film composition, (b) silica aerogel, and (c) silica LC gel whose solvent is LC in its nematic phase. An SEM image of the ordered silica aerogel is displayed in FIG. 4(d). At the final processing stage, the cellulose nanomaterials can be removed to obtain inorganic gels or films. Alternatively, inorganic/cellulose composite gels or films are formed without etching the cellulose nanomaterials. As one non-limiting example, the inorganic gels or films are made of silica, organo-silica, titanium dioxide, aluminum oxide, rare earth oxides, etc. The weight concentration of inorganic nanomaterial in the inorganic/cellulose composites can range from about 1% to about 99%.

Cellulose-Templated Ordered Polymeric Gels or Films

Polymers can be incorporated into the heretofore disclosed ordered gels or films using cellulose nanomaterials as a template. At the final processing stage, the cellulose nanomaterials can be removed to obtain polymeric gels or films. Alternatively, polymeric/cellulose composites gels or films are formed without etching the cellulose nanomaterials. As one non-limiting example, the polymeric gels or films are made of phenol-formaldehyde, melamine-formaldehyde, urea-formaldehyde, poly(acrylic acid), polyester, etc. The weight concentration of polymeric nanomaterial in the polymeric/cellulose composites can range from about 1% to 99%.

Surface Functionalization Ordered Gels

The surface properties of the disclosed gels can be modified by functionalizing the surface of the cellulosic network. The disclosed aerogels having no surface functionalization are hydrophobic and can dissolve upon contact with water. Surface modifiers, example, dimethyloctadecyl[3-(trimethoxysilyl)propyl]ammonium chloride (DMOAP) and trichloro(1H,1H,2H,2H-perfluoro-octyl)silane can be added to the hydrogel before conversion to an aerogel. This type of surface modification provides a hydrophobic aerogel that is stable upon exposure to water.

Ordered Colloidal Dispersions within Gels

Colloidal particles having lengths ranging from about 1 nm to 10 µm can be homogeneously dispersed within the gels. In one embodiment the colloids can include gold and silver plasmonic nanoparticles such as rods, triangular platelets, and triangular frames; ferromagnetic nanoparticles such as ferromagnetic nanoplatelets; quantum dots such as nanospheres, -cubes, -rods, and the like. The colloidal particles are introduced into the cellulose before cross-linking occurs. Cross-linking, through interaction with the colloidal surface ligands, binds the colloidal inclusions to the ordered cellulosic network as described previously herein. Any of the disclosed gels can contain one or more types of colloidal particles.

The disclosed gels have a thickness from about 1 µm to about 10 cm. In one embodiment the thickness varies from about 10 µm to about 1 cm. In another embodiment the thickness varies from about 100 µm to about 10 cm. In a further embodiment the thickness varies from about 50 µm to about 1 cm. In still further embodiment the thickness varies from about 1 cm to about 10 cm. In a yet another embodiment the thickness varies from about 10 µm to about 100 cm. In a yet still further embodiment the thickness varies from about 500 µm to about 10 cm.

The transmissivity of the disclosed gels relates to the amount of electromagnetic radiation that is blocked from passing through the gel. 0% transmission results in an opaque material which allows no transmission. 100% transmission results in a material that is transparent to electromagnetic radiation. The disclosed gels can have a transmission of from 0% to 100%. In one embodiment the gels have a transmission of from about 5% to about 15%. In another embodiment the gels have a transmission of from about 25% to about 50%. In a further embodiment the gels have a transmission of from about 95% to 100%. In a still further embodiment the gels have a transmission of from about 15% to about 35%. In a yet further embodiment the gels have a transmission of from about 50% to about 75%. In a yet another embodiment the gels have a transmission of from about 25% to about 75%.

The disclosed gels and composite materials can have a thermal conductivity of from about $10^{-3}$ W/(m·K) to about 10 W/(m·K). In another embodiment the thermal conductivity is from about $10^{-2}$ W/(m·K) to about 10 W/(m·K). In a further embodiment the thermal conductivity is from about $10^{1}$ W/(m·K) to about 10 W/(m·K). In a still further embodiment the thermal conductivity is from about $10^{-3}$ W/(m·K) to about 1 W/(m·K). In yet further embodiment the thermal conductivity is from about $10^{-2}$ W/(m·K) to about 1 W/(m·K). In yet another embodiment the thermal conductivity is from about 1 W/(m·K) to about 10 W/(m·K).

The emission value of the disclosed gels ranges from about $10^{-2}$ to 0.99.

The disclosed gels and composites can have a bulk modulus of from about 1 Pa to about $10^6$ Pa. In one embodiment the modulus is from about 10 Pa to about $10^5$ Pa. In another embodiment the modulus is from about $10^2$ Pa to about $10^6$ Pa. In a further embodiment the modulus is from about $10^3$ Pa to about $10^5$ Pa. In a still further embodiment the modulus is from about 10 Pa to about $10^3$ Pa. In a yet further embodiment the modulus is from about 1 Pa to about 10 Pa. In a yet another embodiment the modulus is from about $10^4$ Pa to about $10^6$ Pa.

Procedures

Cellulosic starting material for the disclosed gels can be derived from a variety of sources. The surface-sulfuricated cellulose particles (FIG. 1(a) and FIG. 2) that are suspended in water can be prepared by sulfuric acid-mediated oxidation of the natural cellulose. The surface-carboxylated cellulose nanofibers and nanoribbons that are suspended in water can be prepared by 2,2,6,6-tetramethyl-1-piperidinyloxy (TEMPO)-mediated oxidation of the natural cellulose. The dispersions of these nanomaterials spontaneously form a thermodynamically stable cholesteric (for cellulose nanorods) or nematic (for cellulose nanofibers or nanoribbons) liquid crystal phase that can be transformed into a hydrogel (FIG. 1(b) and FIG. 3(a)) with a similarly ordered spatial organization of cellulose particles.

Cellulosic starting material for the disclosed aerogels can be biosynthesized by *Acetobacter xylinum* utilizing, for example, glucose as a carbon source. *Acetobacter xylinum* can be cultivated in a glucose medium for 1-3 weeks under static conditions to produce cellulose pellicles. To remove bacterial cell debris, bacterial cellulose can be boiled in a 1 wt. % NaOH aqueous solution for 2 hours, followed by washing with water and neutralization with 0.2% acetic acid.

Natural cellulose material obtained in this way can easily be disintegrated into individual nanocrystals by a controlled TEMPO mediated oxidation. For example, 2 g of bacterial cellulose was suspended in water (150 mL) containing TEMPO (0.025 g) and NaBr (0.25 g). A 1.8M NaClO solution (4 mL) was added, and the pH of the suspension was maintained at 10 by adding 0.5M NaOH. When no more decrease in pH was observed, the reaction was finished. The pH is then adjusted to 7 by adding 0.5M HCl. The TEMPO-oxidized products were cellulose nanorods of controlled 4-10 nm diameter and 1000-3000 nm length, which were then thoroughly washed with water by filtration & stored at 4° C. The aqueous suspension of cellulose nanocrystals above the critical concentration (~0.1-1% wt. %) self-assemble into liquid crystalline structures-chiral nematic phase, which shows periodic helicoidal structures with a pitch that can be controlled in the range 5-70 μm. This structure can strongly reflect electromagnetic radiation of the wavelength comparable with the pitch, which simultaneously serves as a high efficiency low-emissivity structure by tuning the pitch to be appropriate range. The disclosed films can have a pre-designed gradient of cholesteric pitch in helicoidally ordered nanocrystal self-assembly achieve broadband infrared selective reflection and low-emissivity (compare to the red infrared emission curve taken from solicitation) while being transparent in the visible spectral range & also transmitting solar radiation (blue curve) in near-IR range.

The concentration of the liquid crystalline cellulose nanocrystal dispersions were then adjusted to 0.1 wt. % and used in preliminary studies. The chiral nematic liquid crystalline order of the nanocrystals was then poured into a mold and the orientation of the helix could be aligned uniformly perpendicular to the film plane using a circular shearing. The polarizing optical micrograph shown in FIG. 4c was obtained for a sample with the helical axis aligned in the horizontal direction, providing a side view of the periodic helicoidal structure of the chiral nematic liquid crystal. In the design and fabrication of AIR FILMs, this helical axis will be set orthogonal to the plane of the film and along the normal to the window (FIG. 2), which will be achieved using the process of circular shearing (see, Park J. H. et al. "Macroscopic control of helix orientation in films dried from cholesteric liquid-crystalline cellulose nanocrystal suspensions", *Chem Phys Chem.* 15, 1477-1484 (2014). The suspension of nanocrystals in the cholesteric phase can be "fixed" using a dilute acid solution (1M HCl), so that the fluid cellulose nanocrystals dispersions transformed into highly transparent ordered hydrogels.

After cellulose nanomaterial preparation from one or multiple sources the cellulose nanomaterial can be dispersed in water and aligned by the following methods. First, the aqueous suspension of cellulose nanorods above the critical concentration (about 0.1-4%) self-assemble into a liquid crystalline phase with nematic or cholesteric ordering. Second, in order to induce uniform alignment across the entire dispersion, linear or circular shearing can be used for nematic or cholesteric phases, respectively. Specifically, the dispersion can be confined between glass plates in a mold such that, when a shear stress is applied from the plates in the specified direction (along a line or through a rotation), individual nanomaterial directors align to form a singular director alignment across the confined dispersion. As an alternate but complementary approach to dispersion alignment, the nanocrystals suffer uniform alignment under extrusion from a sufficiently small diameter nozzle, syringe, or similar device. With extrusion alignment, no confining plates are needed such that the aligned dispersion takes the form of a narrow bead, with linear extent much greater than cross-sectional extent, which rests on a supportive substrate or other structure. Additionally, the magnetic anisotropy of cellulose nanomaterial's relative permeability can be exploited to cause uniform alignment of nanocellulose. Under sufficiently strong magnetic fields (about 1 T), uniform alignment of nanocrystals is achieved through the magnetic interaction of the induced magnetic dipole moments of the cellulose nanomaterial with the applied magnetic field. (An oscillating electric field can be used in a similar manner.)

The aligned cellulose nanomaterial dispersion can be cross-linked to convert into a hydrogel while preserving its ordering. The extent of cross-linking of chains of cellulose nanomaterials establishes the degree to which uniform ordering is preserved in the dispersion. That is, for loosely cross-linked cellulose nanomaterials, weak gelation results. Conversely, strong cross-linking yields firm gelation. Gelation results from the addition of an acid, a photoacid generator and exposure to light, an alcohol, or another cationic exchange mechanism to the uniformly ordered cellulose nanomaterial dispersion. Alternatively, the cellulose nanorods, inorganic/cellulose nanorods, or polymeric/cellulose nanorods can self-assemble into cholesteric phase by evaporation.

The nanocellulose-based ordered hydrogel was transformed into organogels (FIG. 1(c) and FIG. 3(b)) by shaking the cellulose-nanomaterial hydrogel gently in an organic-solvent-filled bath while replacing the solvent regularly in order to prompt the replacement of water in the hydrogel by the organic solvent. As one example, twice per day for an extent of three days ethanol was replaced to facilitate total solvent exchange.

The disclosed cellulose aerogels (FIGS. 1(d) and 3(c)) can be produced from the disclosed nano-structured organogel herein above. The resulting cellulose nanocrystal aerogel is a porous material with a skeleton of about 0.1-99.9% cellulose nanocrystals and a porosity of about 0.1-99.9%. To prevent deformation and crumbling of aerogels during the drying stage due to surface tension and capillary pressure in the ambient atmosphere, supercritical drying, freeze drying, or ambient drying low-surface tension solvent are used to remove liquid solvent from cellulose nanocrystal composites while maintaining the disclosed liquid crystalline structure, such as nematic or cholesteric liquid crystalline ordering.

The disclosed cellulose LC gels (FIG. 1(e) and FIG. 3(d)) can be produced from an ordered nano-structured organogel, in which an organic solvent completely miscible with LC is chosen. The organogel is placed in a bath of LC above the boiling point of the organic solvent so that the organic solvent is replaced with LC, which functions as the gel's replacement solvent.

The disclosed cellulose-templated ordered inorganic and polymeric gels or films can be produced by mixing cellulose nanomaterials with silica precursors or prepolymer and drying the composites in the ambient environment. Then the cellulose nanomaterials will be removed either by acidic (for silica aerogel) or basic (for polymeric aerogel) treatment to form a hydrogel. The hydrogel can be further transferred into organogel, aerogel, and LC gel based on the methods described above.

Example 1: Ordered Gels Made from Cellulose Nanorods

Colloidal suspensions of cellulose nanocrystals (CNCs) composed of cellulose nanorods were prepared by controlled sulfuric acid hydrolysis of cotton fibers, according to the method described by Revol and co-workers (J.-F. Revol, H. Bradford, J. Giasson, R. H. Marchessault, D. G. Gray, *Int. J. Biol. Macromol.* 14, 170 (1992)). During this process, disordered or paracrystalline regions of cellulose are preferentially hydrolyzed, whereas crystalline regions, which have a higher resistance to acid, remain intact. 7 g of cotton was added to 200 g of 65 wt. % sulfuric acid and stirred at 45° C. in a water bath for up to several hours until the cellulose had fully hydrolyzed. The mixture was sonicated occasionally, which was found to help degrade the amorphous cellulose regions. The suspensions of cellulose were then centrifuged at 9000 rpm for 10 min and re-dispersed in deionized water 6 times to remove the excess sulfuric acid. The resulting precipitate was placed into a dialysis tubing (MWCO 12000-14000, Thermo Fisher Scientific Inc.) in de-ionized water for three days until the water pH remained constant. The dimensions of CNCs are about 5-10 nm in cross-section and, on average, 100-300 nm in length. Then 3 wt. % CNCs solution was cast in a mold and evaporated under ambient conditions to obtain an aerogel.

Example 2: Ordered Gels Made from Cellulose Nanofibers or Nanoribbons

Cellulose nanofibers with the dimension of 4.8 nm by several micrometers were synthesized following the literature (T. Saito, M. Hirota, N. Tamura, S. Kimura, H. Fukuzumi, L. Heux and A. Isogai, *Biomacromolecules*, 10, 1992 (2009)). Briefly, cellulose based bleached coffee filter (1 g) was suspended in 0.05M sodium phosphate buffer (90 mL, pH 6.8) dissolving 16 mg of 2,2,6,6-tetramethylpiperidine-1-oxyl radical (TEMPO) and 1.13 g of 80% sodium chlorite in an airtight flask. The 2 M sodium hypochlorite solution (0.5 mL, 1.0 mmol) was diluted to 0.1 M with the same 0.05 M buffer used as the oxidation medium and was added at one step to the flask. The flask was immediately stoppered, and the suspension was stirred at 500 rpm and 60° C. for 96 hours. After cooling the suspension to room temperature, the TEMPO-oxidized cellulose was thoroughly washed with water by filtration. Then 0.1-1.0 vol. % CNFs aqueous dispersion was poured into a mold, aligned by a shear force, and several drops of 1 M HCl solution was added to form a hydrogel after 2 hours. The hydrogel was immersed into ethanol for 2 days for solvent exchange to form an organogel. To form a liquid-crystal gel, the organogel was immersed in a bath of liquid crystal 4-cyano-4'-pentylbiphenyl at 90° C. for 12 hours. Subsequent cooling to room temperature after solvent exchange caused the LC to enter its expected nematic phase. The aerogel was formed by critical point drying of the organogel.

Example 3: Ordered Gels Made from Cellulose-Nanorods-Templated Silica

CNCs were synthesized according the method in Example 1. Then 5 mL of 3 wt. % CNCs dispersion was mixed with 10-75 μL of silica precursor tetramethyl orthosilicate and stirred for 1 hour. Then the composites were cast into a Petri dish and dried over 1-2 days. The CNCs were then removed by pyrolysis method (e.g. 540° C. for 20 hours) or keeping in 16% sodium hydroxide solution for 16 hours. The silica hydrogel was formed and can be further transferred into organogel by solvent exchange and aerogel by critical point drying or ambient drying.

Example 4: Ordered Gels Made from Cellulose-Nanorods-Templated Polymer

CNCs were synthesized according to the method in Example 1. Then 5 mL of 3 wt. % CNCs dispersion was mixed with 10-75 mg of water-soluble preformed polymer and stirred for 10 min. Then the composites were casted into a Petri dish and dried over 1-2 days. The film was then cured at polymerization temperature for 24 hours. The CNCs were then removed by 16% sodium hydroxide solution for 16 hours. The polymer hydrogel was formed and can be further transferred into organogel by solvent exchange and aerogel by critical point drying or ambient drying.

Figure 5:
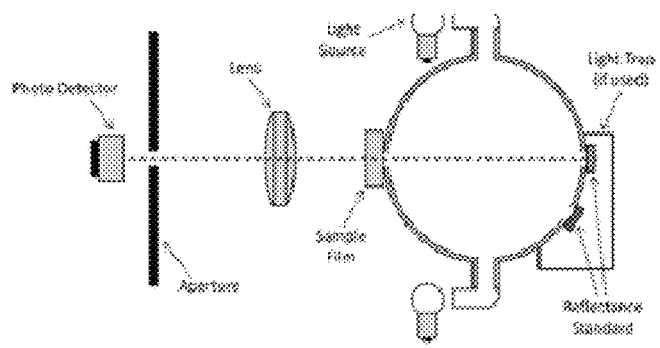
FIG. 5 is a schematic representation of a spectrometer assembly that can be used for haze measurements at diffuse illumination and unidirectional viewing.

The light scattered upon passing through aerogels can produce a hazy appearance, which can result in the reduction of contrast of objects viewed through the film. Haze measurements can be performed using a hazemeter or spectrometer. FIG. 5 describes an apparatus developed and adapted to measure the quality of the disclosed aerogels. The apparatus in FIG. 5 has the advantage of conducting haze measurements that also provides diagnostic data on the origins of the haze.

The typical setup includes an integrating sphere where the measured film is placed against the sphere entrance port. The surface of the interior of the integrating sphere is highly reflecting throughout the visible wavelengths obtained from light sources. The light entering the integrating sphere is reflected from the surface towards the tested film. Then the light transmitted through the film is focused and directed to a photodetector. A photodetector in the spectrophotometer setup is computer driven and values for transmission and haze can be automatically calculated. The haze can be determined as haze=$100 \times (T_d/T_t)$, where $T_t$ is a total transmittance depending on intensity of incident light & total light transmitted by the film & $T_d$ is diffuse transmittance depending on light scattered by a measuring setup & the film.

Measurement of Sound Proofing Characteristics

Figure 6:
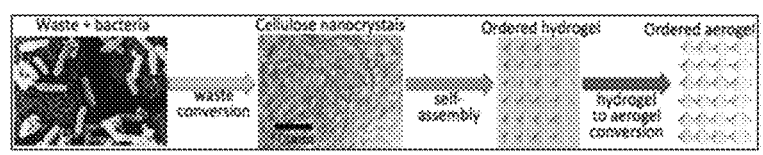
FIG. 6 describes a general schematic of one embodiment for the fabrication of the disclosed aerogels.

Sound proofing characterization can be conducted by imaging of nanoparticles using TEM and SEM. FIG. 6 outlines a procedure for probing of the pore size, surface area, and structural properties of cholesteric cellulose-based aerogels under different preparation conditions. The ordering of nanocrystals on large scales will be probed using 3D imaging techniques such as Fluorescence Confocal Polarizing Microscopy (FCPM), Coherent Anti-Stokes Raman Scattering Polarizing Microscopy (CARS-PM), and Three-Photon Excitation Fluorescence Polarizing Microscopy (3PEF-PM). in addition, the monitoring of the disclosed liquid crystal and aerogel uniformity in lateral directions can be accomplished by using conventional dark-field, bright-field, and polarizing optical microscopy. Visible- and infra-red-range spectroscopy can also be utilized. The other properties of the disclosed aerogels include mechanical properties (both as-prepared aerogels and encapsulated, ready-to-install films), as well as soundproofing and condensation resistance of the films installed on single-pane windows.

Measurement of Aerogel Thermophysical Properties

Figure 7:
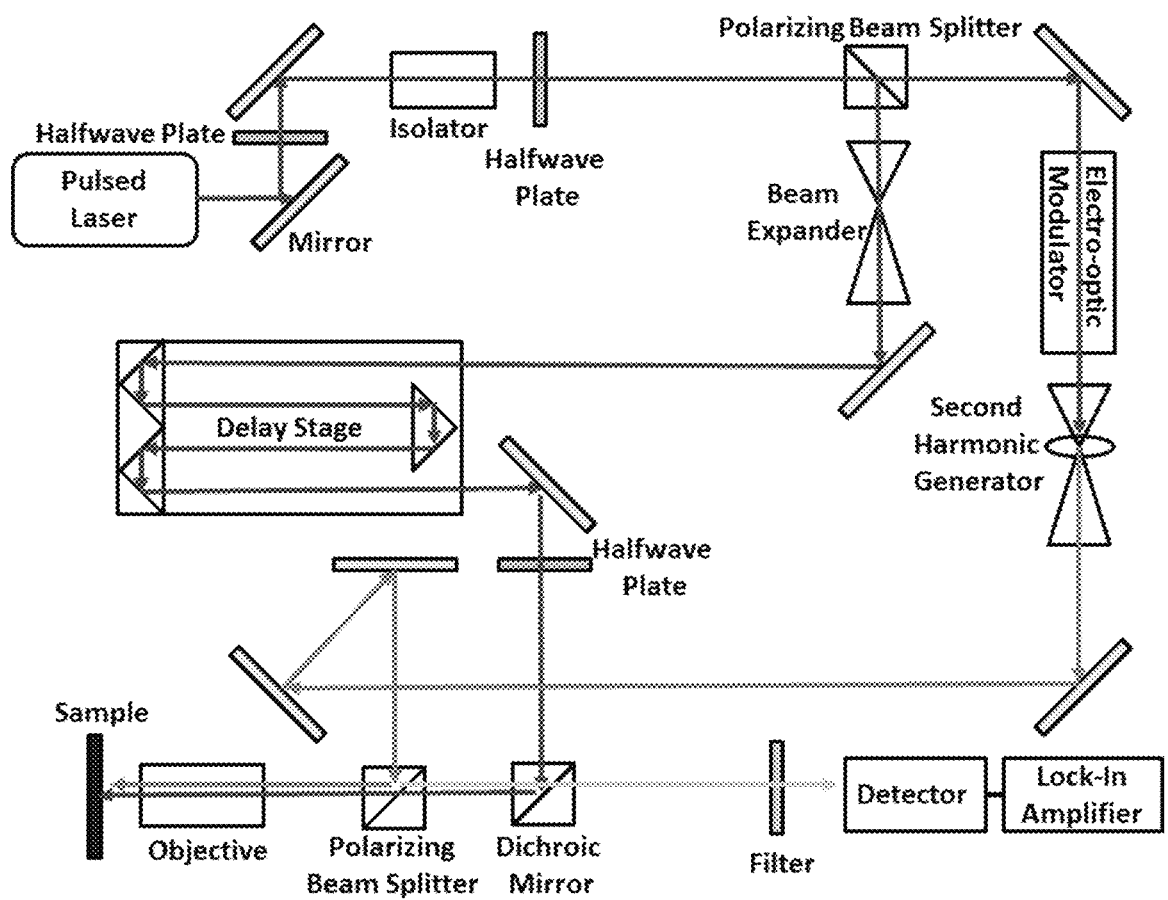
FIG. 7 shows the optical pathway of a typical pump-and-probe measurement system.

Prior to the application of films onto a window the thermophysical properties (for example, thermal conductivity, heat capacity) are characterized by the optical pump-and-probe method in order to determine the type of film that is suitable for the specific application. This procedure uses a femtosecond laser to construct a high temporal resolution temperature measurement system. FIG. 7 shows the optical pathway of a typical pump-and-probe measurement system. In the optical pump and probe method, sub-picosecond (ps) time resolution is made possible by splitting the ultrafast sub-ps laser pulse output into an intense heating pulse, i.e., a "pump" beam, and a weaker "probe" beam, and controlling the optical path length difference of the pump and probe beam through a mechanical delay stage. The decay of the temperature rise is measured by the reflected energy of the probe pulse series. The thermal conductivity can then be deduced by fitting the temperature decay curves.

Condensation Resistance

Figure 8:
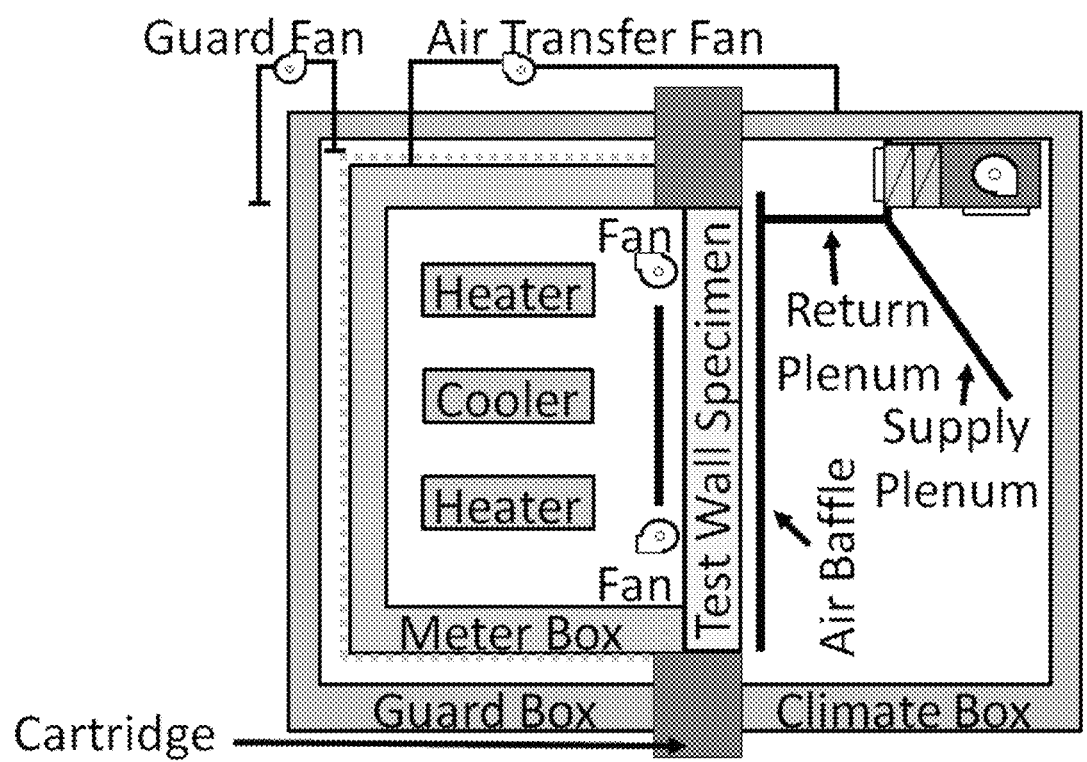
FIG. 8 discloses the components of a hot box apparatus: a metering box (simulating interior temperature) on one side of the window specimen; a controlled guard box surrounding the metering box; a climate chamber box (simulating exterior temperature) on the other side; and the specimen frame providing specimen support & insulation.

After determining the thermal conductivity of a disclosed aerogel, films can be applied atop of a window to determine the thermal insulation and condensation resistance performance, following the current standards of ASTM C1363-11 and ASTM C1199-14. This test method establishes principles for design of a hot box apparatus & requirements for the determination of the steady-state thermal performance of windows when exposed to controlled laboratory conditions. The window thermal insulation and condensation performance is represented by the overall heat transfer coefficient, U. FIG. 8 discloses the components of a hot box apparatus: a metering box (simulating interior temperature) on one side of the window specimen; a controlled guard box surrounding the metering box; a climate chamber box (simulating exterior temperature) on the other side; and the specimen frame providing specimen support & insulation.

The walls of the hot box are insulated panels of plywood adhered to either side of a solid layer of XPS insulation. The space conditioning system used in the meter box employs hydronic cooling and electric resistance heating. The meter box cooling is measured using high precision thermocouples in combination with a precision flow meter to accurately quantify the heat removed from the meter box. Heat is added into the meter box via PM-controlled electric heaters. Precision resistor circuits are employed to measure the heat added into the meter box. A constant and precise temperature can be maintained and the total heat addition/removal can be measured. The hot box employs an insulated guard box surrounds the meter box and a hydronic guard loop is installed over the outside surface of the meter box. The guard box minimizes the influence of temperature changes in the lab. The liquid guard loop further ensures the outside surface of the meter box remains at a constant temperature. An insulated baffle separates the air space from the mixing chamber of the meter box. The baffle panels are constructed using thermal insulation material. For a 1 m×1 m test window sample, at least 25 calibrated precision thermocouples are used to measure temperatures on the baffle surface, 25 corresponding points in the air stream and at least 25 points on the interior surface of the test window specimen. Air drawn through the meter box baffle space at velocities representative of convection in real world conditions. DC powered axial draw-through circulation fans, at the top and bottom of the baffle, are used to ensure smooth flow along the surface of the wall sample in the direction that convection would occur.

The climate box has the same dimensions and construction as the guard box. The climate side air baffles are constructed using the same materials and methods as the air baffles in the meter box. Heat is added to/removed from the climate box via four fan coils which are connected to a liquid chiller and a hydronic heater. Electric resistance heaters permits fine tuning of the temperatures and ensures that temperatures remain close to the set point for the duration of the test. The climate box has the capacity to run a range of realistic outdoor temperatures, from −30° C. to 60° C. This enables the tested window assembly to remain undisturbed when tested from cold to hot climate conditions. Overall heat transfer coefficient is:

$$U = \frac{Q}{A \cdot (T_{meter} - T_{climate})}$$

where Q is the time rate of net heat flow through the meter box opening, W; A is meter box opening area, $m^2$; $T_{meter}$ and $T_{climate}$ are temperatures of meter box and climate box, respectively.

Cellulose-Polysiloxane Hybrid Aerogels

Further disclosed are transparent cellulose-polysiloxane hybrid hydrogels, organogels and aerogels and a process for preparing the disclosed transparent cellulose-polysiloxane hybrid transparent cellulose-polysiloxane hybrid hydrogels, organogels and aerogels. Disclosed is a cellulose-polysiloxane hybrid aerogel, comprising:
a) a cellulosic matrix; and
b) a polysiloxane surface network Without wishing to be limited by theory, these characteristics are achieved by strictly controlling the dimensions of nanofibers and the homogeneous gel skeleton networks that they form, which can be tuned to form orientationally ordered liquid crystal (LC) states. In the gel fabrication process, an optimized acid/base catalyzed sol-gel reaction in a surfactant-based solution is used to form a polymethylsilsesquioxane (PMSQ) surface network.

Cellulose nanofibers having a uniform diameter are first surface functionalized. This functionalization can employ small charged molecules or polymer grafting resulting in increased cellulose nanofiber stability. Subsequently, these nanofibers are crosslinked with PMSQ fibers. In addition to their high optical transparency, super thermal insulation, flexibility and mechanical robustness, the disclosed hybrid aerogels can be made optically isotropic or anisotropic, depending on the intended use by the formulator. In the case of anisotropic aerogels, they can be fabricated starting from the LC states of colloidal dispersions of nanofibers. The resulting compositions can have practical applications as they result can result in devices having optical polarization, thereby the ability to control visible light polarization while providing simultaneous thermal insulation.

Disclosed herein is a process for preparing polymethylsilsesquioxane (PMSQ) network cellulosic aerogels, comprising:
a) contacting an aqueous dispersion of cellulose with a oxidizing system that oxidizes the C6 hydroxyl units of cellulose to carboxylate units to form an aqueous solution of oxidized cellulose nanofibers;
b) reacting the oxidized cellulose nanofibers with a surface modifying agent to form an aqueous solution of surface modified cellulose nanofibers;
c) contacting the surface modified cellulose nanofibers with polymethylsilsesquioxane (PMSQ) to form an aqueous polysiloxane precursor;
d) hydrolyzing the polysiloxane precursor in the presence of an acid catalyst to form a PMSQ network cellulosic hydrogel;
e) exchanging the water contained in the hydrogel with a volatile solvent to form an organogel; and
f) removing the volatile solvent to form an aerogel.

In one embodiment the oxidizing system comprises:
a) an admixture of (2,2,6,6-Tetramethylpiperidin-1-yl) oxyl (TEMPO) and NaClO.

Modifying Agents

In one embodiment the surface modifying agent is chosen from $C_1$-$C_6$ linear or branched, saturated or unsaturated alkylamine, low molecular weight compounds comprising a cationic moiety, oligomers or polymers.

Figure 9A:
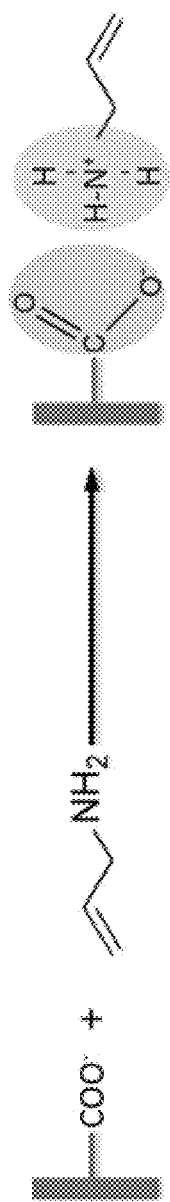
FIGS. 9A-9C various Tempo-oxidized cellulose nanoparticle modifying agents.

The $C_1$-$C_6$ linear or branched, saturated or unsaturated alkylamines react with the cellulose carboxyl units under the conditions of the present process to form a carboxylate-quaternary ammonium complex, for example, as depicted in FIG. 9A. One example of this embodiment comprises the use of allylamine as the modifying agent.

Another embodiment comprises the use of an oligomer or polymer as the modifying agent. In one iteration m-PEG-amines having an average molecular weight of from about 2000 to about 10,000 daltons are used to modify the surface of the oxidized cellulose nanofibers. In one non-limiting example of this iteration the modifying agent is an m-PEG amine having an average molecular weight of 5000 daltons. For example, the m-PEG amine depicted in FIG. 9C wherein the index n is approximately 112. Any oligomer or polymer that can covalently bond to the surface carboxylates of the oxidized nanofibers can be used to modify the cellulosic surface.

Figure 9B:
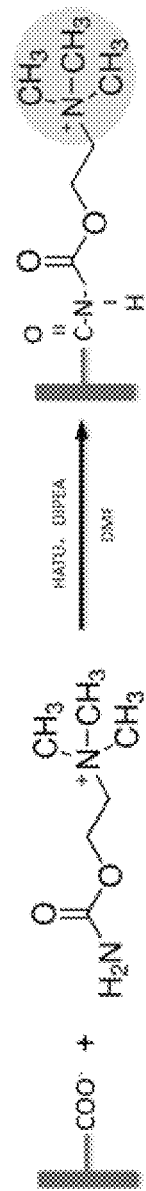

A further embodiment comprises a modifying unit that is a low molecular weight compound comprising a cationic moiety. The molecular weight of compounds of this type are less than about 400 g/mol. A non-limiting example of this embodiment is depicted in FIG. 9B wherein the use of a carbamoylcholine salt is the modifying agent. The salt can be chlorine, bromine and the like.

General Procedure

In order for spontaneous nematic ordering of the nanofibers to occur, the nanocellulose concentration must be above the critical concentration. This behavior provides a unique opportunity for the formulator to impart LC ordering at low TOCN volume fractions which provides a means for obtaining the disclosed optical anisotropy and other properties.

Raw cellulosic material obtained from natural sources is used to form the disclosed hydrogels, organogels and aerogels. For example, cotton, grains, paper products made from natural sources and the like. The cellulosic material is first oxidized at the C6 saccharide carbons thereby oxidizing the —$CH_2OH$ moieties to carboxylate moieties, —COOH.

The oxidized cellulosic material is then treated with a modifying agent, which allows the cellulose nanofibers in the hydrogel to remain aligned and non-reactive to the subsequent treatment with the networking agent. Next, following treatment with the modifying agent, the nanofibers are treated with methyltrimethoxysilane (networking agent) which is hydrolyzed under acidic conditions to form a polysiloxane network over the hydrogel. Gelation results in a highly-transparent monolithic hydrogel of functionalized TOCNs, cross-linked by an isotropic, bicontinuous polysiloxane nanofibrous network.

The water is removed from the hydrogel by exchange with a volatile organic solvent to form the corresponding organogel. The resulting organogel exhibits both an isotropic and liquid-crystalline arrangement, which can be controlled by regulating the surface-modified TOCN concentration. These orientationally ordered self-assembled structures are locked in place by the formation of the polysiloxane network. The disclosed process preserves the small and uniform cross-sections of individual fibers and their network and, consequently, assures low light scattering.

The corresponding aerogel is formed by drying of the organogel, which can be shaped to the needs of the formulator. In addition to mechanical flexibility and robustness, many practical aerogel applications can require a high degree of hydrophobicity (for example, to assure that these aerogels are stable under ambient conditions and in humid environments).

Example 5: PMSQ Network Cellulosic Aerogels

Figure 9C:

The disclosed cellulose nanofibers are produced through the oxidation of native cellulose by selectively modifying the C6 primary hydroxyl groups on the surface of native cellulose to carboxylate groups catalyzed by 2,2,6,6-tetramethylpiperidine-1-oxyl radical (TEMPO) under mild pH aqueous conditions, known as TEMPO-oxidized cellulose nanofibers (TOCNs). The nanofibers with a diameter of 4.8 nm and micrometer-scale lengths are stabilized in a basic solution by the Coulombic repulsion of their anionic carboxylate moieties, which overpower their tendency to form hydrogen bonds. As a result, the aqueous TOCN dispersions are highly transparent. To eliminate the strong light scattering originating from bundling and clustering of TOCNs which are uncontrollably crosslinked by direct hydrogel bonds, as often observed in polymeric fibrous aerogels, we instead cross-link TOCNs with polysiloxane. This technique precludes the direct contacts between TOCNs and thereby generates a uniform nanofibrous network that exhibits small scattering cross-sectional areas. Hydrolysis of the polysiloxane precursor is acid-catalyzed. However, even under mildly acidic conditions and dilute concentrations, TOCNs tend to form a gel-like phase due to the hydrogen bonding between carboxylic acid functional groups. To stably disperse TOCNs in polysiloxane precursor solutions, we implement various TOCN surface functionalization schemes, as illustrated in FIGS. 9A-9C.

The TEMPO-mediated oxidation of cellulose produces a large density of carboxylic groups (~0.8 mmol/g) on the surface of nanofibrillated cellulose that is available for surface modification. This provides a means for altering the physical adsorption properties of the cellulose nanoparticles by covalently bonding either low molecular weight cationic molecules or polymeric chains to the surface thereby resulting in stabilized TOCNs by either electrostatic repulsion or steric hindrance.

In one embodiment as depicted in FIG. 9A this modification is affected by physisorption of one or more polyelectrolytic monomers, in this example allylamine, to the anionic carboxylate groups of the oxidized cellulose. This process does not significantly affect the cross-sectional diameter of the TOCN's because of the size of the low molecular weight of the cationic small molecule.

In another embodiment as depicted in FIG. 9B the surface functionalization can be accomplished by reaction of the carboxyl groups with a cationic-amine comprising adduct. FIG. 9B depicts the reaction of 2-(carbamoyloxy)-N,N,N-trimethylethanaminium (choline carbamate) with the TOCN's. This reaction introduces another form of cationic charge electrostatic repulsion.

In a further embodiment as depicted in FIG. 9C the surface of the TOCN's are modified by reaction with a polymeric material, in this example a methoxy polyethylene glycol amine (mPEG-amine). Grafting of a polymer of this type provides a means for improving colloidal-TOCN stabilization.

The functionalization of the TOCN's produces cellulosic matrices that are stable to treatment with polysiloxane in the subsequent step of the disclosed process.

Figure 10:
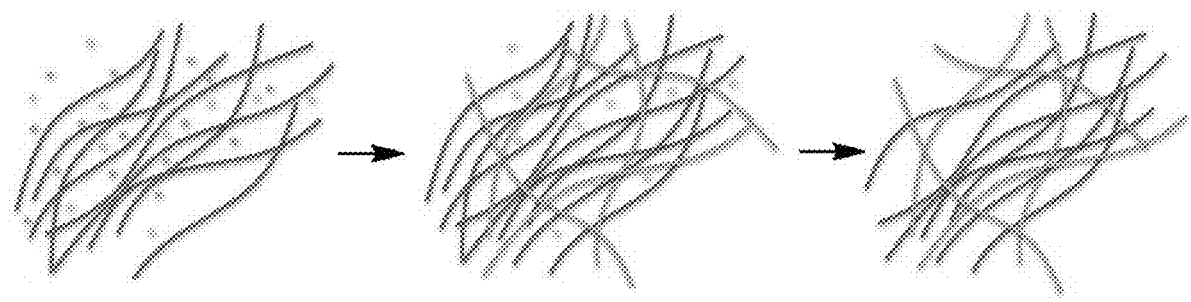
FIG. 10 depicts the disclosed process for forming polymethylsilsesquioxane (PMSG) network cellulosic hydrogels, organogels and aerogels process in general.

FIG. 10 depicts the process in general. Oxidized and surface modified cellulose nanofibers as an aqueous suspension are represented by the long aligned fibers and the differently shaded dots represent water molecules and molecules of PMSQ (far left figure). The center figure represents Steps (c) and (d) of the process above wherein the nanofibers are first contacted with PMSQ then the PMSQ is hydrolyzed to form a PMSQ network cellulosic hydrogel. The resultant of Steps (e) and (f) is depicted in the figure on the far right, the resulting aerogel. The resulting transparent surface-modified TOCNs' aqueous colloidal dispersions can exhibit LC ordering, depending upon the volume fraction of the nanofibers in the colloidal dispersion. In addition, these solutions can exhibit birefringence when they are observed between cross polarizers as depicted in FIG. 10.

Preparation of TEMPO-Oxidized Cellulose Nanofiber.

TEMPO having the dimensions of 4.8 nm by several micrometers were prepared using bleached wood cellulose as follows. Wood-cellulose-based bleached coffee filter (1 g) was suspended in 0.05 M sodium phosphate buffer (90 mL, pH 6.8) by dissolving 16 mg of TEMPO and 1.13 g of 80% sodium chlorite in a reaction flask. Then 455 μL of NaClO solution (13% active chlorine) was diluted ten times with the same 0.05 M sodium phosphate buffer and was added in one portion to the reaction flask. The flask was immediately stoppered, and the suspension was stirred at 500 rpm at 60° C. for 120 hours. After cooling the suspension to room temperature, the TEMPO-oxidized cellulose fibrils were thoroughly washed with water by centrifugation at 8700 rpm for 30 min. TEMPO-pretreated cellulose fibrils were then diluted at 0.25 wt. %, mechanically blended at 28,000 rpm by a food processor, homogenized using a tip sonifier and filtered using a membrane filter with a pore-size of 11 μm. The resulting transparent solution was then concentrated by a rotary evaporator at 60° C.

Surface Modification of TOCN

1. Cationic Surface Physisorption

The surface of the TEMPO-oxidized cellulose nanofibers were then functionalized by physical adsorption of allylamine onto the nanofibers. 500 mg of 0.2 wt. % nanofiber aqueous solution was diluted by 2 mL of distilled and deionized water and combined with 10 mg of allylamine. The mixture was stirred overnight and dialyzed for 2 days in a deionized water bath across a cellulose acetate membrane with a cutoff molecular weight of 12,000-14,000 g/mol to obtain the desired allylamine-TOCNs.

2. Charged Small Molecule Modification

An aqueous TOCN dispersion (500 mg of 0.38 wt. %) was diluted with 2 mL of deionized water followed by the addition of 24 mg of 1-[bis(dimethylamino)methylene]-1H-1,2,3-triazolo[4,5-b]pyridinium 3-oxid hexafluorophosphate (HATU), 20 μL of N,N-diisopropyl-ethylamine (DIPEA) and 50 mg carbamoylcholine chloride and 40 μL dimethylformamide (DMF). The mixture was stirred for 2 days and dialyzed for another 2 days affording the desired dispersed surface modified nanofibers.

3. Oligomer/Polymer Modification

An aqueous TOCN dispersion (500 mg of 0.2 wt. %) was diluted with 2 mL of DI water and followed by mixing with 28 mg of HATU, 20 μL of DIPEA, 18 mg mPEG-amine (MW=5000) and 40 μL DMF. The mixture was stirred for 2 days and then dialyzed for another 2 days to finally obtain mPEG-TOCNs. All of the functionalized TOCN dispersions were concentrated by a rotary evaporator to the desired concentration.

Preparation of PMSQ Network Cellulosic Hydrogels

The disclosed PMSQ network cellulosic hydrogels were fabricated by cross-linking functional TOCNs with polysiloxane. For example and in general, cetyltrimethylammonium bromide (0.4 g) (CTAB) and 3.0 g of urea were dissolved in 8 mL of deionized (DI) water with sonication until the sol became homogeneous. To this solution is added 2 mL of a functionalized surface modified TOCN at differing concentrations, 1-5 mL of methyltrimethoxysilane (MTMS) and 0.01 mmol acetic acid under vigorous stirring. After stirring each sample for 30 minutes at room temperature, the sol was degassed in a vacuum oven and then transferred into a polystyrene petri dish with a diameter of 5 cm, sealed for gelation and allowed to age for 3 days in a 60° C. furnace to form the desired hydrogels.

Preparation of PMSQ Network Cellulosic Aerogels

The hydrogels formed above were taken from the petri dish and immersed in DI water for 24 hours to remove the urea and residual CTAB. This was followed by solvent exchange with isopropanol, which was replaced every 12 hours, at 60° C. for 2 days. Finally, $CO_2$ supercritical drying at 38° C. under 8.6 MPa was conducted to obtain dried aerogel samples in a critical point dryer. This provided aerogels having bulk densities ranging from 30-200 mg/cm$^3$ depending upon the amount of MTMS added to the functionalized surface modified cellulose in the above step. In one embodiment an aerogel having a density of 69 mg/cm$^3$ promotes optimal optical transmission and mechanical flexibility. In one iteration of the disclosed process no stress is introduced to TOCN-PMSQ aerogel during processing.

Figure 11:
FIG. 11 is a photograph showing the optical transparency of a hydrogel formed from the disclosed process.
Figure 12:
FIG. 12 is a photograph showing the optical transparency of an organogel formed from the disclosed process.
Figure 13:
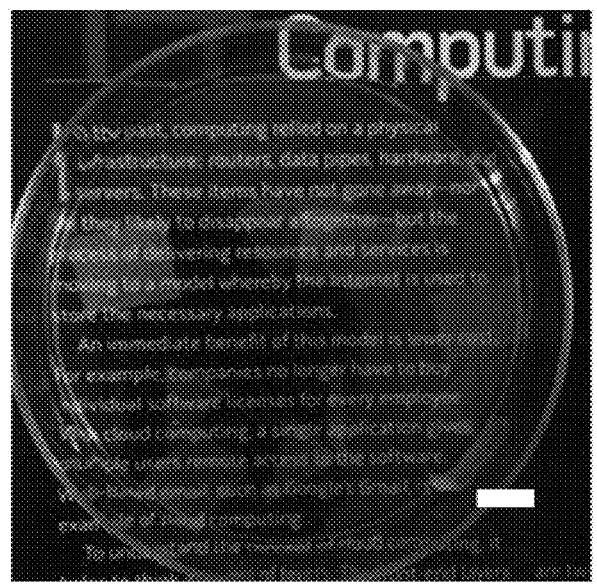
FIG. 13 is photograph showing the optical transparency of an aerogel formed from the disclosed process wherein the surface modifying agent is allylamine.
Figure 14:
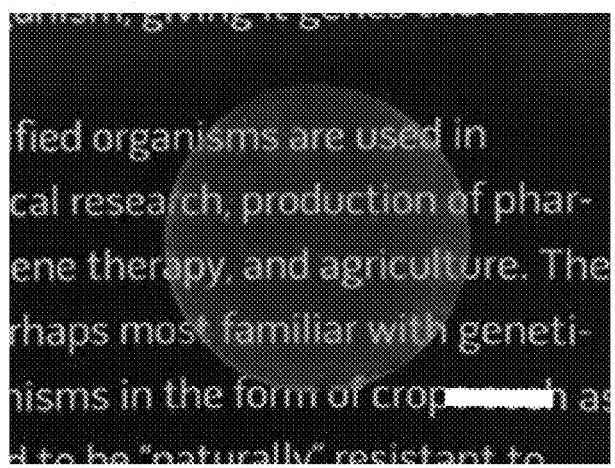
FIG. 14 is a photograph of an aerogel formed by the disclosed process wherein the surface modifying agent is an m-PEG-amine having an average molecular weight of 5000 daltons.
Figure 15:
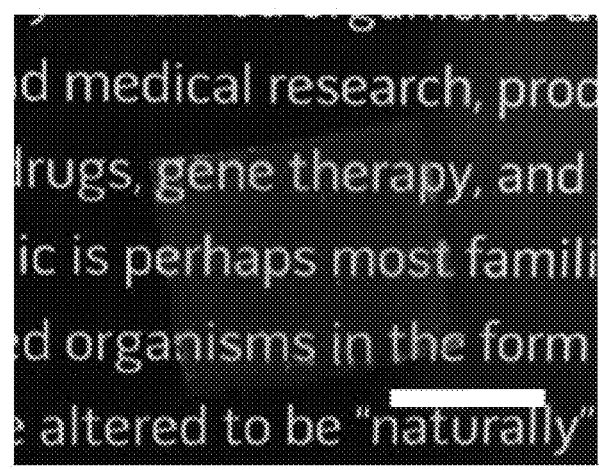
FIG. 15 is a photograph of an aerogel formed by the disclosed process wherein the surface modifying agent is carbamoylcholine chloride.

FIG. 11 is a photograph showing the optical transparency of a hydrogel formed from the disclosed process. This hydrogel is a highly-transparent monolithic hydrogel cross-linked by an isotropic, bicontinuous polysiloxane nanofibrous network as described herein. The hydrogel is contained within the outlined dotted area. FIG. 12 is a photograph showing the optical transparency of an organogel formed from the disclosed process. The organogel is contained within the outlined dotted area. FIG. 13 is photograph showing the optical transparency of an aerogel formed from the disclosed process wherein the surface modifying agent is allylamine. The aerogel is contained within the circle. FIG. 14 is a photograph of an aerogel formed by the disclosed process wherein the surface modifying agent is an m-PEG-amine having an average molecular weight of 5000 daltons. The circular aerogel is positioned on top of a copy of text. AS can be seen in the photograph the aerogel is transparent in that neither the color nor the text is distorted. FIG. 15 is a photograph of an aerogel formed by the disclosed process wherein the surface modifying agent is carbamoylcholine chloride. The circular aerogel is positioned on top of a copy of text. The aerogel is transparent in that neither the color nor the text is distorted.

Figure 16:
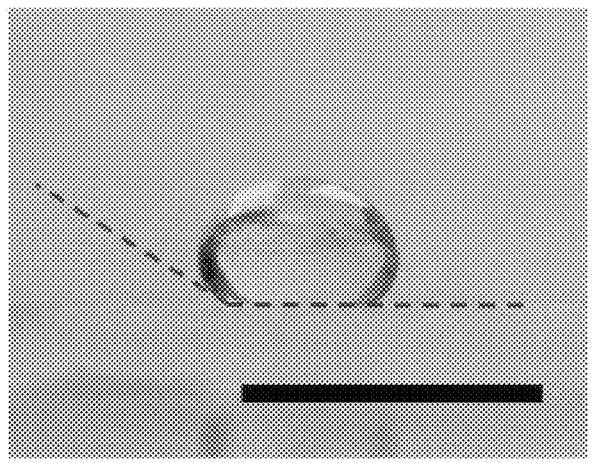
FIG. 16 depicts that the carbamoylcholine chloride-capped TOCN-PMSQ aerogels exhibit hydrophobic surface characteristics.

As depicted in FIG. 16 the carbamoylcholine chloride-capped TOCN-PMSQ aerogels exhibit hydrophobic surface characteristics with a typical contact angle of 148°, largely due to the presence of hydrophobic methyl groups on the polysiloxane fibers within the nanostructured aerogels. An advantage of the disclosed process is that there is no need for post-synthetic hydrophobization treatment when the disclosed gels are used for hydrophobic applications.

The disclosed aerogels were analyzed for both their optical and electron imaging and spectra characteristics. For both polarized and unpolarized brightfield optical microscopic imaging, an Olympus BX-51 polarizing optical microscope was equipped with 10×, 20×, and 50× air objectives with a numerical aperture NA=0.3-0.9 and a CCD camera Spot 14.2 ColorMosaic (Diagnostic Instruments, Inc.). Transmission spectra were studied using a spectrometer USB2000-FLG (Ocean Optics) mounted on the microscope. For light transmittance and haze measurements of aerogels, a UV-VIS-NIR spectrometer, ranging from 190 nm to 3200 nm, (UV-3101pc, from Shimadzu) equipped with a Lab Sphere brand integrating sphere attachment was employed. Haze is defined as the ratio of diffuse transmission to total transmission, where diffuse transmission is defined as transmitted light varying by greater than or equal to a 5° separation from the direction of incident light. Infrared transmission spectra from wavenumbers 400 cm$^{-1}$ to 4000 cm$^{-1}$ (wavelengths 2.5 μm-25 μm) were recorded on a Fourier-transform infrared spectroscopy (FTIR) spectrometer (Nicolet AVATAR 370 DTGS from Thermo) equipped with an a integrating sphere (NIR IntegratIR, from Pike). Photographs of samples were taken using a digital camera. IR thermographs were obtained by an IR camera (T630sc, from FLIR). TEM images were obtained using a CM100 microscope (from FEI Philips) at 80 kV. The TOCN samples were negatively stained with phosphotungstic acid to increase imaging contrast: 2 μL of the sample is dropcasted on the formvar coated copper grid, allowed to settle for drying and then dipped into the stain solution (aqueous 2 wt. % phosphotungstic acid). The porous morphology of TOCN-PMSQ was characterized using an SEM using a Hitachi Su3500 and Carl Zeiss EVO MA 10 system. For this, freshly cut surfaces of the TOCN-PMSQ aerogels were sputtered with a thin layer of gold and observed under SEM at a low voltage of 5 kV (as optimized to avoid the distortion of the aerogel samples).

Figure 17A:
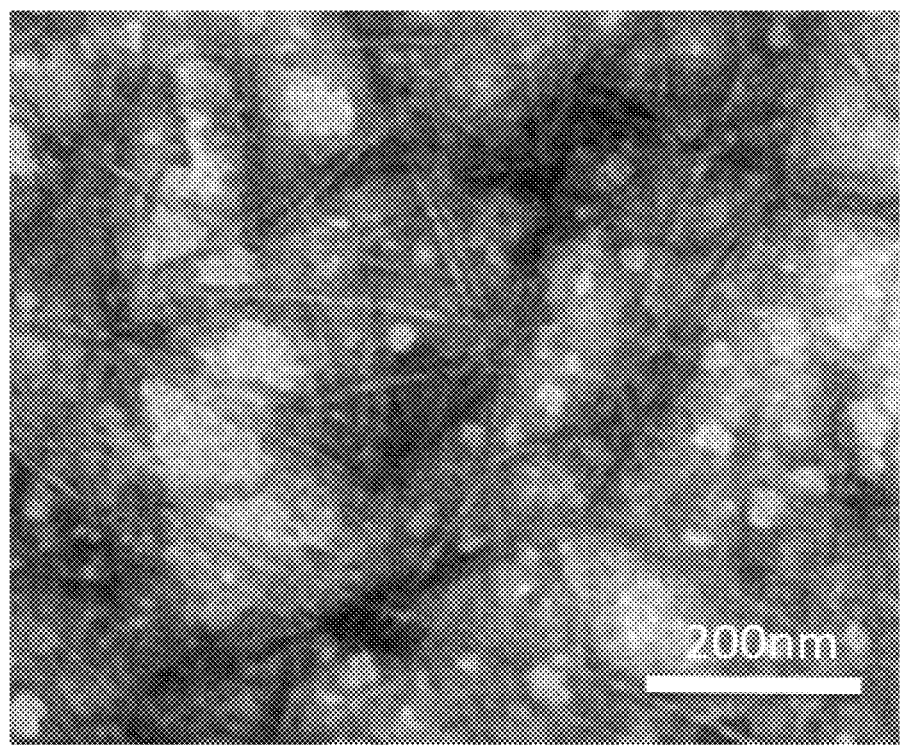
FIGS. 17A-17C are transmission electron microscopy (TEM) micrographs of the disclosed aerogels at various magnifications.
Figure 17B:
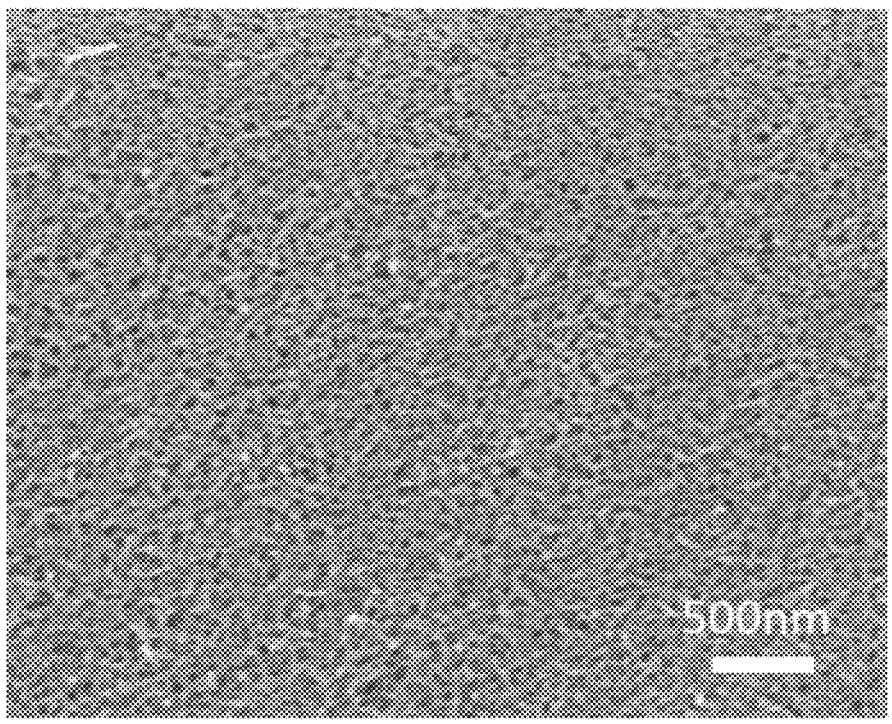
Figure 17C:
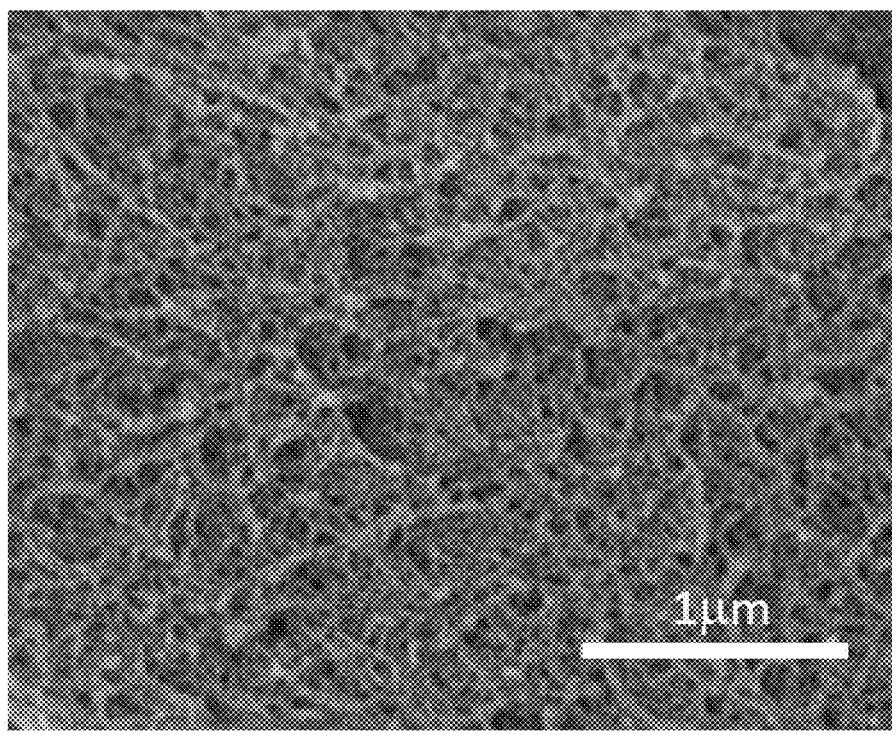
Figure 18:
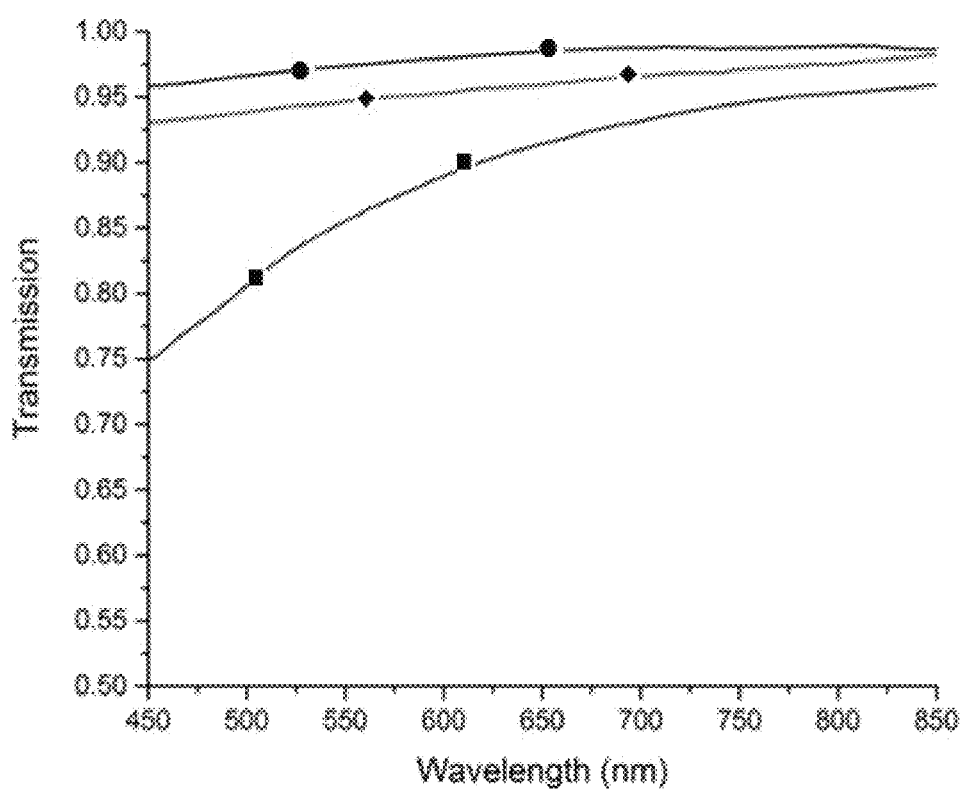
FIG. 18 shows the visible transmission of a disclosed aerogel.

FIGS. 17A-17C are transmission electron microscopy (TEM) micrographs of the disclosed aerogels at various magnifications. FIG. 17A shows that the colloidal dispersions consist of mostly individualized TOCNs, each of diameter $D_c \approx 5$ nm and length $L_c \approx 1$-2 μm. FIGS. 17B and 17C are scanning electron microscopy (SEM) that depict the well-defined and uniform-diameter 10-15 nm nanofibers that are formed by polysiloxane treatment and individually dispersed TOCNs fibers within the aerogels as well as a narrow pore-size distribution of their resulting porous network. The depicted aerogel samples exhibit 3D bicontinuous network-like structures, in which both the smooth gel skeletons and the pores are interconnected without aggregation or clustering. The example depicted in FIGS. 17A-17C have a bulk density $\rho_b$ is calculated to be 69 mg/cm$^3$ by weight/volume ratio of the sample. The porosity, defined as $=(1-\rho_b/\rho_s) \times 100\%$, is then determined to be $\varepsilon \approx 94.9\%$, where $\rho_s$ is the skeletal density taken to be 1.35 g/cm$^3$. The average pore size for this particular example is calculated to be approximately 100 nm, consistent with the value observed directly from the SEM images. The mesoscale morphology of the 2.0-mm thick QA-capped TOCN-PMSQ composite aerogel with ultrathin fibers and uniform pore size distribution yields hydrogels and organogels with very high light transmission greater than 90% and aerogels with visible transmission close to 90% at 600 nm as depicted in FIG. 18.

Figure 19:
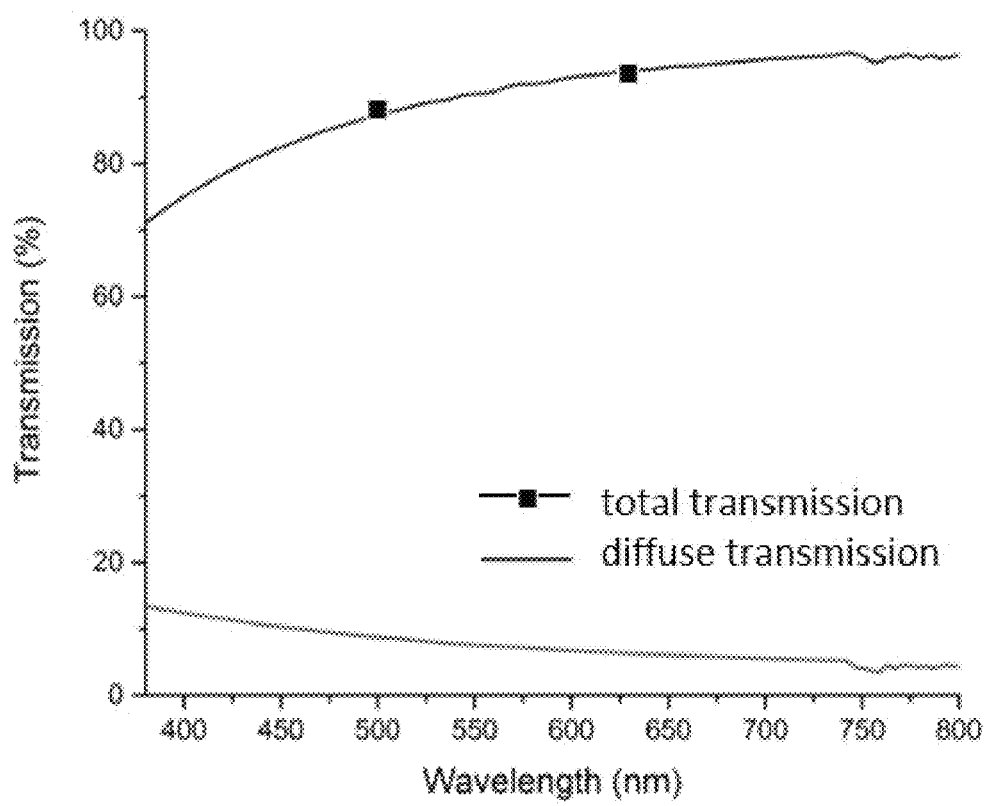
FIG. 19 shows the haze coefficient of a disclosed aerogel.
Figure 20:
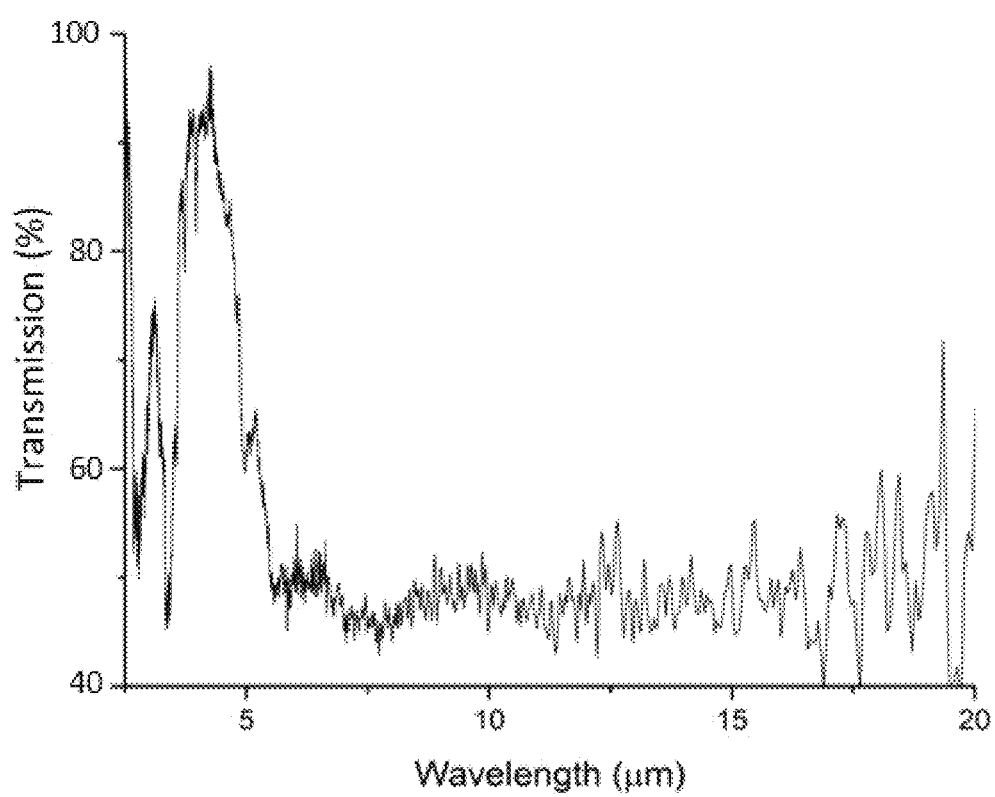
FIG. 20 depicts the that the PMSQ matrix causes TOCN-PMSQ aerogels to exhibit strong absorption at a wavelength of 6-20 μm that is mainly due to the Si—O bond.

The exampled aerogel's haze coefficient, defined as the ratio of diffuse transmittance and total light transmittance, was determined to equal to 8.4% FIG. 19 and is characterized following the ASTM D1003 standard using an integrating sphere setup when integrated across the visible range (390-700 nm) The PMSQ matrix causes TOCN-PMSQ aerogels to exhibit strong absorption at a wavelength of 6-20 μm, which is mainly due to the Si—O bonds FIG. 20. This provides the formulator the opportunity to separately control transmission of visible and infrared light, in embodiments wherein control of solar gain and emissivity are important, i.e., in smart-window applications.

The disclosed aerogels were analyzed for their thermal, mechanical, and durability characteristics. The thermal conductivity is measured by measuring both the heat capacity and thermal diffusivity of the aerogel samples. The heat capacity of aerogel is measured by differential scanning calorimetry (DSC 204 F1 Phoenix, Netzsch). The thermal diffusivity of aerogel is characterized by a laser flash apparatus (LFA 457, Netzsch). Briefly, an optical source instantaneously heats one side of the material and the temperature increment on the other side of the material is recorded by infrared thermography for facile, noninvasive temperature sensing. To prevent the direct heating of the detector by laser light, the top and the bottom of the aerogel were covered with highly conductive carbon tape to prevent the laser from penetrating through the sample. The thermal conductivity of the aerogel can be calculated by subtracting the contribution of carbon tape from the effective thermal conductivity of the sandwich structure, which was determined by performing measurements for samples of different thickness. The Instron 5965 material-test system was used to probe the mechanical properties and determine stress-strain relationships. The mechanical properties shown in FIG. 4f were measured with TOCN-PMSQ aerogel samples with 0.25 vol. % QA-capped TOCN cut into rectangular strips of 20 mm×6 mm×1 mm. Aerogel durability testing was performed under a 500 Watt mercury lamp (Sun System 5, from Sunlight Supply Inc.) and in a Tenney environmental test chambers held at 80° C. and 80% relative humidity for 24 hours.

Figure 21:
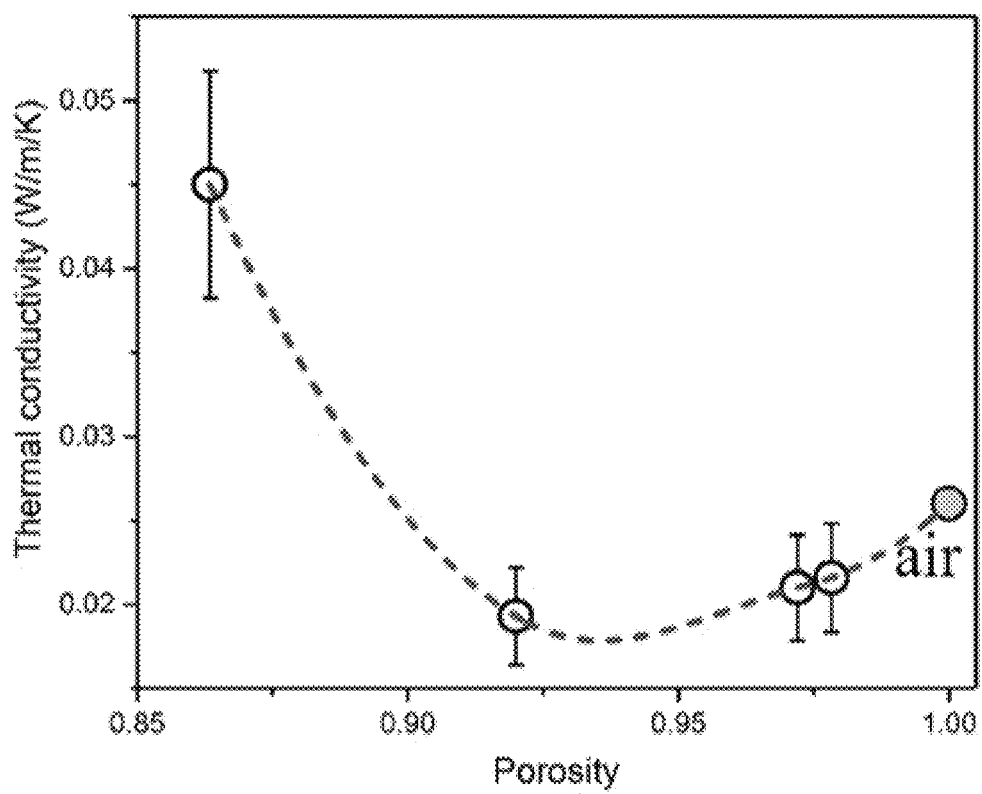
FIG. 21 shows the measured thermal conductivity of an TOCN-PMSQ aerogel versus sample porosity.
Figure 22:
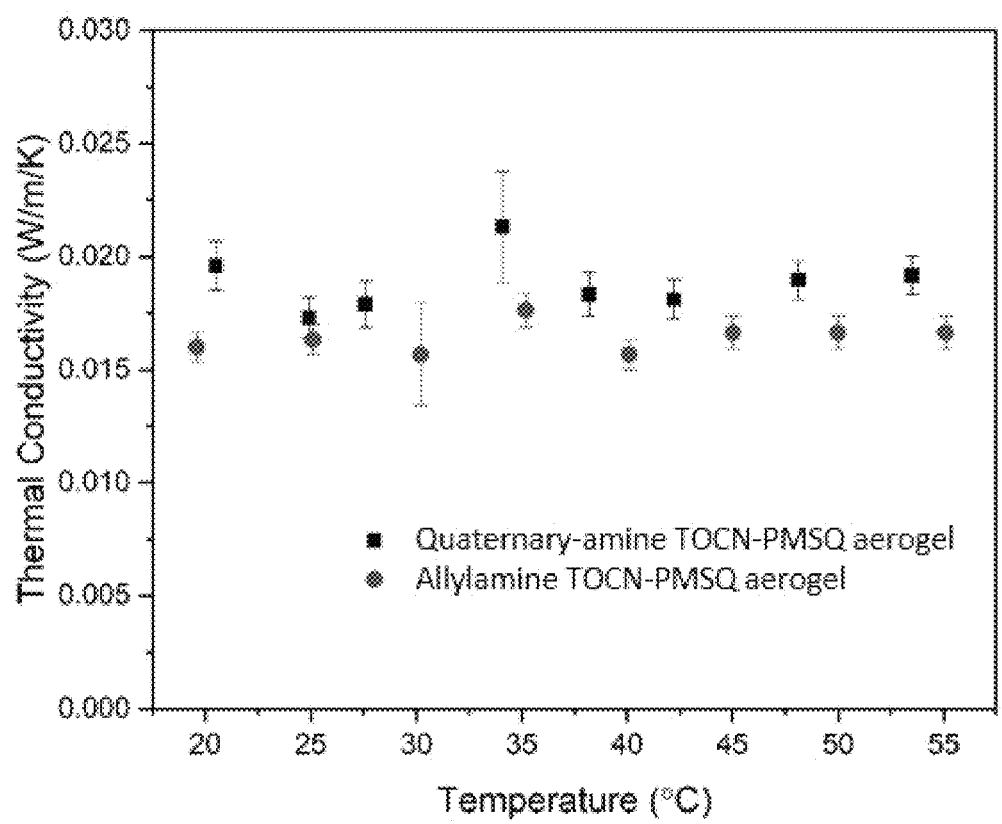
FIG. 22 depicts the comparison of thermal conductivity between an aerogel formed from carbamoylcholine chloride modified nanocellulose (quaternary-amine) and an allylamine modified aerogel.
Figure 23:
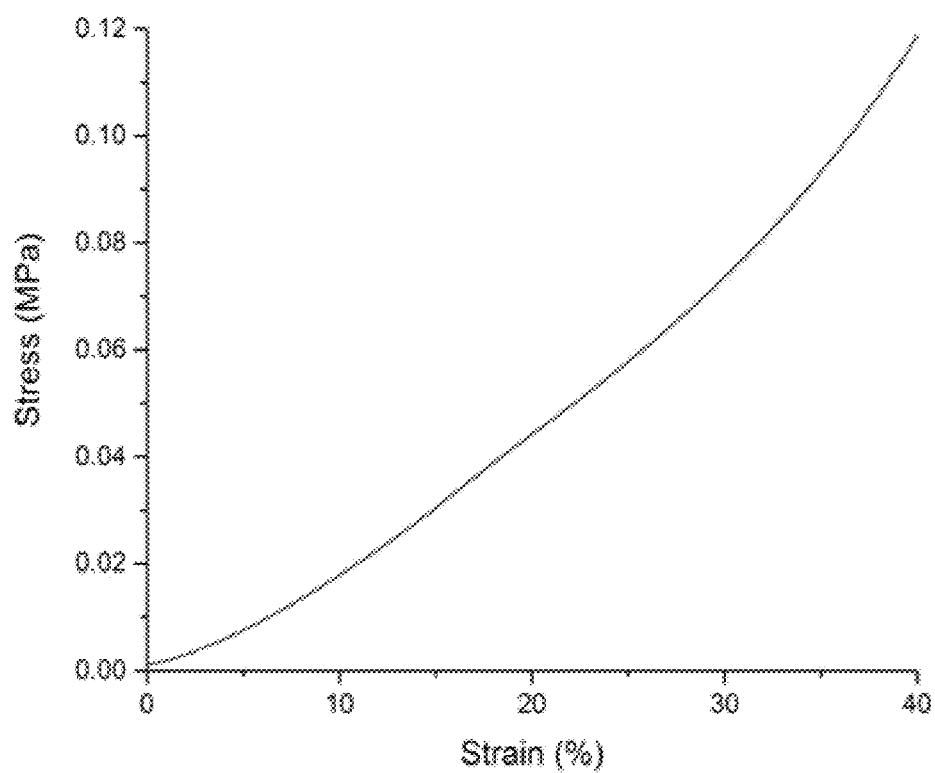
FIG. 23 depicts the compression stress-strain relation for a TOCN-PMSQ aerogel with 0.06 wt. % of TOCN

FIG. 21 shows the measured thermal conductivity of an TOCN-PMSQ aerogel versus sample porosity. FIG. 22 depicts the comparison of thermal conductivity between an aerogel formed from carbamoylcholine chloride modified nanocellulose (quaternary-amine) and an allylamine modified aerogel. FIG. 23 depicts the compression stress-strain relation for a TOCN-PMSQ aerogel with 0.06 wt. % of TOCN.

What is claimed is:

1. A liquid crystal gel comprising:
   a) a cellulosic matrix network formed of crosslinked nanocellulose material having a cross section of between about 3 nm and about 50 nm; and
   b) one or more liquid crystal solvents,
   wherein the one or more liquid crystal solvents are nematic liquid crystals.

2. The gel according to claim 1, wherein the one or more liquid crystal solvents are chosen from 1-(trans-4-hexylcyclohexyl)-4-isothiocyanatobenzene; 4'-(hexyloxy)-4-biphenylcarbonitrile; 4'-(octyloxy)-4-biphenyl-carbonitrile; 4'-(pentyloxy)-4-biphenylcarbonitrile; 4'-heptyl-4-biphenylcarbonitrile; 4'-hexyl-4-biphenylcarbonitrile; 4'-octyl-4-biphenylcarbonitrile; 4'-pentyl-4-biphenylcarbonitrile; 4,4'-azoxyanisole; 4-isothiocyanatophenyl 4-pentyl-bicyclo[2.2.2]octane-1-carboxylate; 4-(trans-4-pentylcyclohexyl)benzonitrile; 4-methoxycinnamic acid; N-(4-ethoxybenzylidene)-4-butylaniline; or N-(4-methoxybenzylidene)-4-butylaniline.

3. The gel according to claim 1, wherein the one or more liquid crystal solvents consist of one or more of 1-(trans-4-hexylcyclohexyl)-4-isothiocyanatobenzene; 41-(hexyloxy)-4-biphenylcarbonitrile; 4'-(octyloxy)-4-biphenyl-carbonitrile; 4'-(pentyloxy)-4-biphenylcarbonitrile; 4'-heptyl-4-biphenylcarbonitrile; 4'-hexyl-4-biphenylcarbonitrile; 4'-octyl-4-biphenylcarbonitrile; 4'-pentyl-4-biphenylcarbonitrile; 4,4'-azoxyanisole; 4-isothiocyanatophenyl 4-pentyl-bicyclo[2.2.2]octane-1-carboxylate; 4-(trans-4-pentylcyclohexyl)benzonitrile; 4-methoxycinnamic acid; N-(4-ethoxybenzylidene)-4-butylaniline; or N-(4-methoxybenzylidene)-4-butylaniline.

4. The gel according to claim 1, wherein the cross section is between about 3 nm to about 10 nm.

5. The gel according to claim 1, wherein the cellulosic matrix is formed from an organogel.

6. The gel according to claim 1, wherein the cellulosic matrix is comprised of cellulose ribbons or fibers having an aspect ratio of about 1:100 to about 1:1000.

7. The gel according to claim 1, comprising nanorods having an aspect ratio of about 1:10 to about 1:100.

8. A composite structure comprising a layer of the gel according to claim 1 and a layer comprising nanorod cellulosic material.

9. A composite structure comprising a layer of the gel according to claim 1 and a layer comprising nanofiber cellulosic material.

10. The gel according to claim 1, wherein the cellulose nanofibers comprise (2,2,6,6-tetramethylpiperidin-1-yl)oxyl (TEMPO)-oxidized cellulose nanofiber.

11. The gel according to claim 1, wherein the network comprises a polysiloxane network.

12. A liquid crystal gel comprising:
    a) a cellulosic matrix network formed of crosslinked nanocellulose material having a cross section of between about 3 nm and about 50 nm; and
    b) one or more liquid crystal solvents,
    wherein the one or more liquid crystal solvents are chosen from 1-(trans-4-hexylcyclohexyl)-4-isothiocyanatobenzene; 4'-(hexyloxy)-4-biphenylcarbonitrile; 41-(octyloxy)-4-biphenyl-carbonitrile; 4'-(pentyloxy)-4-biphenylcarbonitrile; 4'-heptyl-4-biphenylcarbonitrile; 4'-hexyl-4-biphenylcarbonitrile; 4'-octyl-4-biphenylcarbonitrile; 4'-pentyl-4-biphenylcarbonitrile;
    4,4'-azoxyanisole; 4-isothiocyanatophenyl 4-pentyl-bicyclo[2.2.2]octane-1-carboxylate; 4-(trans-4-pentylcyclohexyl)benzonitrile; 4-methoxycinnamic acid; N-(4-ethoxybenzylidene)-4-butylaniline; or N-(4-methoxybenzylidene)-4-butylaniline.

13. The gel according to claim 12, wherein the cellulosic matrix is comprised of cellulose ribbons or fibers having an aspect ratio of about 1:100 to about 1:1000.

14. The gel according to claim 12, wherein the cross section of between about 3 nm to about 10 nm.

15. A structure comprising lamellae that are formed from the liquid crystal gel according to claim 12.

* * * * *